US006983930B1

(12) United States Patent
La Mendola et al.

(10) Patent No.: US 6,983,930 B1
(45) Date of Patent: Jan. 10, 2006

(54) CLAMPING DEVICE WITH FLEXIBLE ARM

(75) Inventors: Christopher Louis La Mendola, Lloyd Harbor, NY (US); Paul Hatch, Chicago, IL (US); Kristian Buschmann, Chicago, IL (US); Kevin R. Lovell, Paw Paw, MI (US); Joseph R. Peters, St. Joseph, MI (US)

(73) Assignee: Christopher Louis La Mendola, Lloyd Harbor, NY (US)

(*) Notice: Subject to any disclaimer, the term of this patent is extended or adjusted under 35 U.S.C. 154(b) by 0 days.

(21) Appl. No.: 10/977,909

(22) Filed: Oct. 28, 2004

(51) Int. Cl.
*B24B 1/20* (2006.01)

(52) U.S. Cl. ................. 269/45; 269/3; 269/6; 248/104; 248/229.13; 24/300; 24/543

(58) Field of Classification Search .................. 269/45, 269/3, 6, 95; 248/229.13, 104; 24/543, 24/300, 482, 495
See application file for complete search history.

(56) References Cited

U.S. PATENT DOCUMENTS

| | | | |
|---|---|---|---|
| 1,542,208 A | | 6/1925 | Berger |
| 2,324,803 A | | 7/1943 | Snyder |
| 2,510,198 A | * | 6/1950 | Tesmer .................. 248/229.25 |
| 2,887,974 A | | 5/1959 | Weinfeld |
| 3,096,962 A | | 7/1963 | Meijs |
| 3,168,274 A | | 2/1965 | Street |
| 3,584,822 A | | 6/1971 | Oram |
| 3,858,578 A | | 1/1975 | Milo |
| 4,070,011 A | | 1/1978 | Glesser |
| 4,108,315 A | | 8/1978 | Inao |
| D293,470 S | | 12/1987 | Adler |
| 4,949,927 A | | 8/1990 | Madocks et al. |
| 5,348,259 A | | 9/1994 | Blanco et al. |
| 5,447,149 A | | 9/1995 | Kikawada et al. |
| 5,489,075 A | * | 2/1996 | Ible ............................ 248/104 |
| 5,626,607 A | | 5/1997 | Malecki et al. |
| 5,662,300 A | | 9/1997 | Michelson |
| 5,749,602 A | * | 5/1998 | Delaney et al. ............... 285/61 |
| 5,899,425 A | | 5/1999 | Corey Jr. et al. |
| 5,934,656 A | | 8/1999 | Carder |
| 6,119,906 A | | 9/2000 | Bond et al. |
| 6,173,947 B1 | | 1/2001 | Johnson |
| 6,357,710 B1 | * | 3/2002 | Fielden et al. ........... 248/276.1 |
| 6,520,495 B1 | * | 2/2003 | La Mendola ................ 269/45 |

* cited by examiner

*Primary Examiner*—Lee D. Wilson
(74) *Attorney, Agent, or Firm*—Greenberg Traurig, LLP

(57) ABSTRACT

One embodiment of the present invention is directed to a clamping device with an attached arm in which the act of opening the clamp makes the arm flexible and the act of closing the clamp makes the arm rigid. By operating in this manner, the present invention may allow a worker to position the arm (while flexible) in any number of different and easily attainable positions while also allowing the worker to secure a workpiece and immobilize the arm in a single step. In another embodiment of the present invention the arm can be made flexible independently of opening the clamp.

30 Claims, 27 Drawing Sheets

FIG. 5
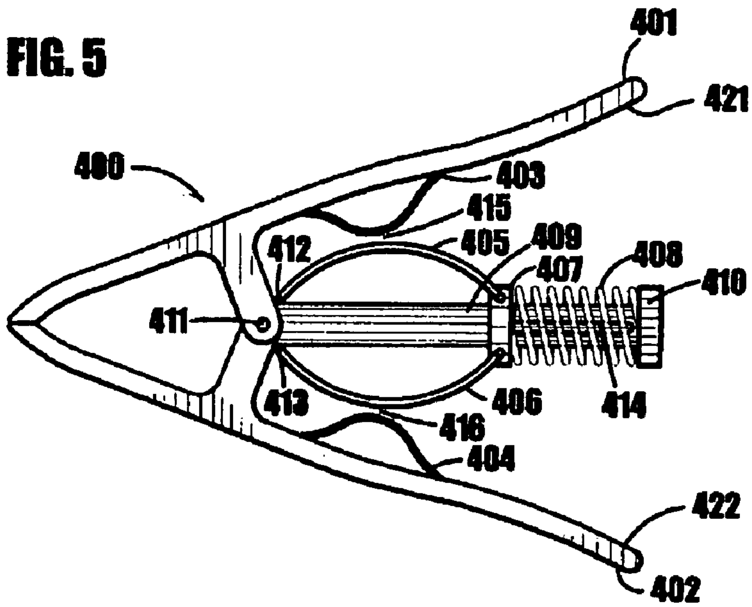
FIG. 6a
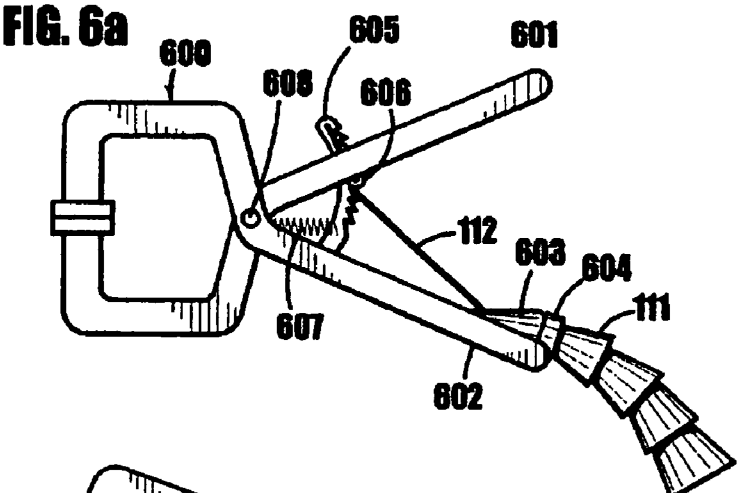
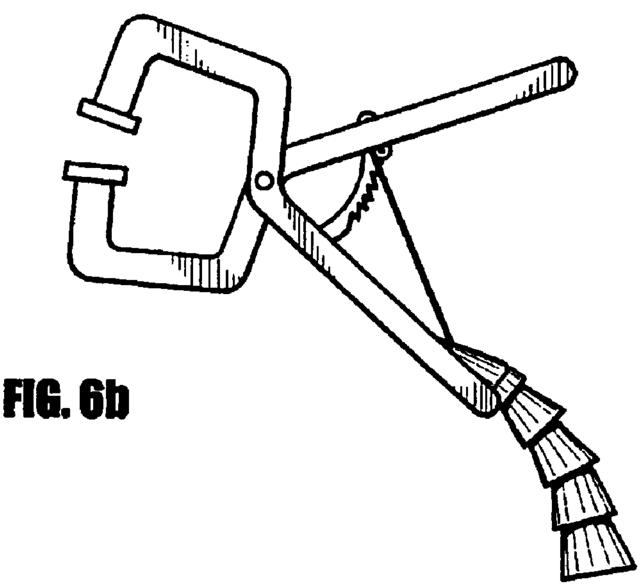
FIG. 6b

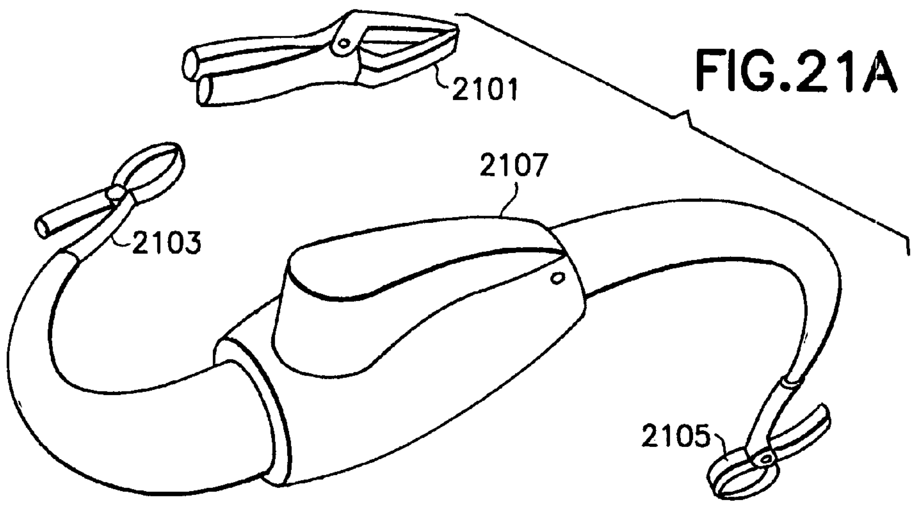
FIG.21A
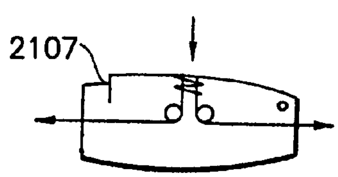
FIG.21B
FIG.21C
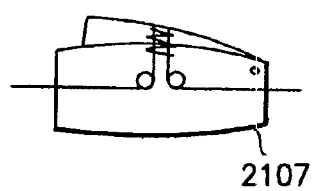
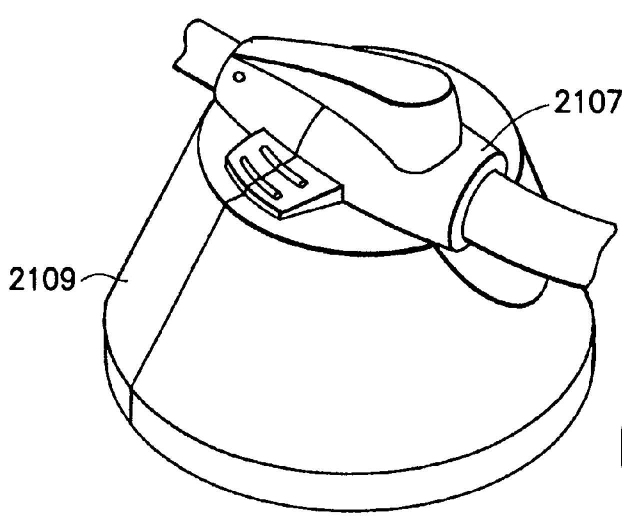
FIG.21D

CLAMPING DEVICE WITH FLEXIBLE ARM

FIELD OF THE INVENTION

One embodiment of the present invention is directed to a clamping device with an attached arm in which the act of opening the clamp makes the arm flexible and the act of closing the clamp makes the arm rigid. By operating in this manner, the present invention may allow a worker to position the arm (while flexible) in any number of different and easily attainable positions while also allowing the worker to secure a workpiece and immobilize the arm in a single step.

In another embodiment of the present invention the arm can be made flexible independently of opening the clamp.

The uses of such a device are numerous, including (but not limited to) many mechanical work projects such as carpentry, plumbing, auto repair, electronics assembly and surgery.

For the purposes of the present application the term cable is intended to refer to any type of wire, rope, cord, string, band, strap, chain or the like.

Further, for the purposes of the present application the term "flexible" is intended to refer to being moveable or bendable without an undue application of force given the context (e.g., size, material, use) of the device being called flexible.

Further still, for the purposes of the present application the term "inflexible" (or "rigid") is intended to refer to being immoveable or unbendable without an undue application of force given the context (e.g., size, material, use) of the device being called inflexible (or rigid).

BACKGROUND OF THE INVENTION

Clamping devices are well known in the mechanical arts, being useful for work projects such as carpentry, plumbing, electronics, auto repair, and surgery. Many such clamping devices are attached to flexible arms, as described in, for example, U.S. Pat. Nos. 2,510,198, 2,887,974, and 3,858,578. However, none of these clamping devices enables a user to clamp an object and make rigid the flexible arm with one motion. In contrast, each requires that the flexible arm be positioned and then held in place to clamp a workpiece while a separate mechanism is used to render the arm rigid.

Each of the prior art clamping devices has the disadvantage that a user must in separate motions: (a) clamp a workpiece; and (b) position and render rigid the arm of the clamp. These separate motions make it difficult to properly position and clamp a workpiece. In these situations, many adjustments are frequently necessary before a workpiece is properly positioned and clamped. Thus, there is a need for a clamp with an attached flexible arm wherein the arm can be made rigid in the same movement that closes the clamp.

BRIEF DESCRIPTION OF THE DRAWINGS

FIG. 5 is a side view of a bow spring clamp embodiment of the present invention;

FIG. 6*a* is a side view of a ratchet type clamp embodiment of the present invention;

FIG. 6*b* is a side view of the ratchet type clamp of FIG. 6*a;*

FIGS. 21A–21D show additional embodiments of the present invention (FIG. 21A shows a perspective view; FIGS. 21B and 21C show side views (in cross-section); and FIG. 21D shows a perspective view)

Figure 1:
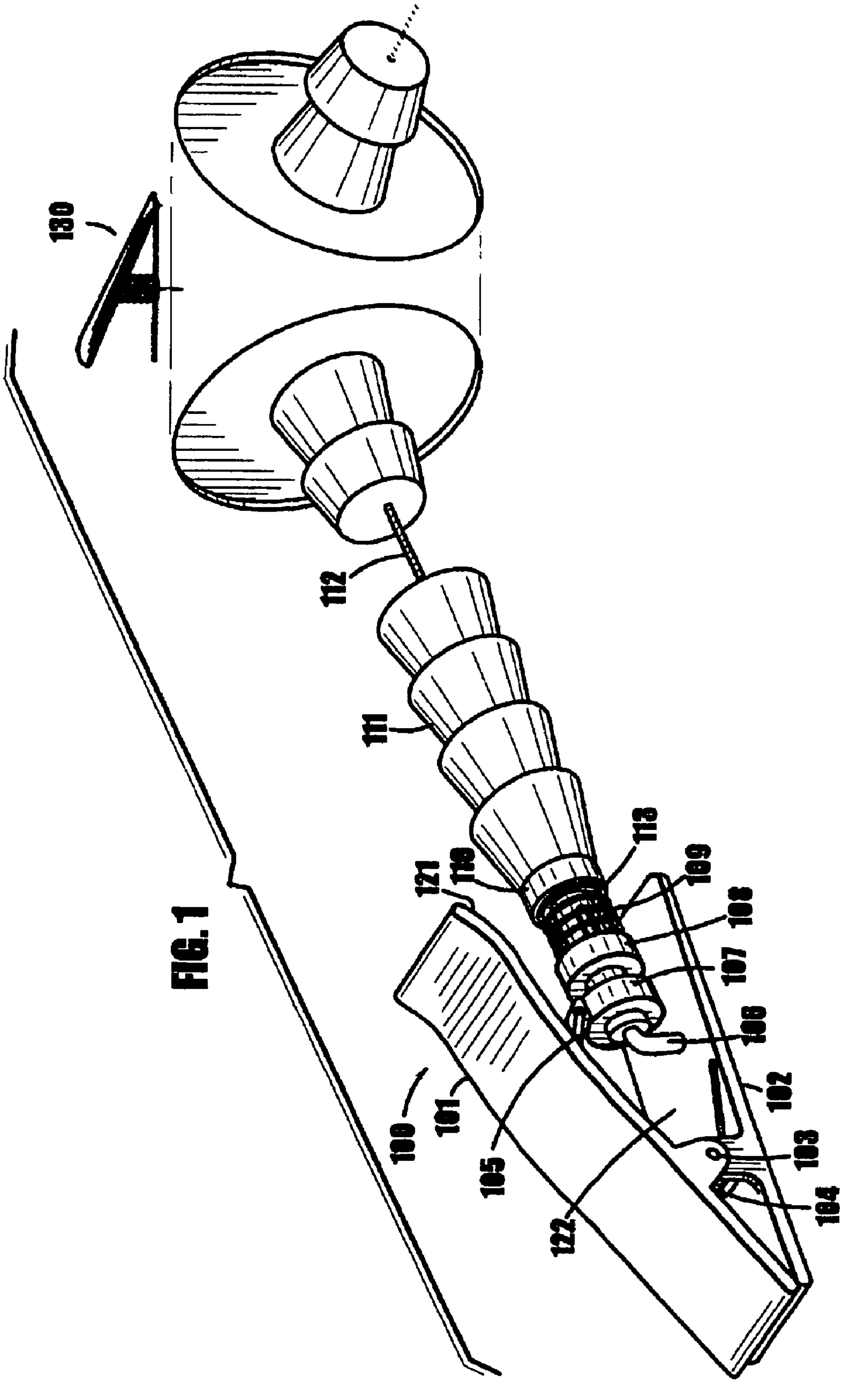
FIG. 1 is a perspective view of a coil spring clamp embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, any figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment an apparatus for clamping an object includes a clamp with a first gripping element and a second gripping element that are connected by a pivot rod. The clamp of this embodiment includes a biasing element to maintain the clamp in a closed position in the absence of applied pressure. The clamp also includes a release mechanism and an arm with a cable encased by a plurality of segments (e.g., tubular, cone shaped segments). The cable is attached to the release mechanism. The release mechanism is in turn attached to the clamp and includes one or more biasing elements (e.g., either coil spring(s) and/or bow spring(s)) for: (a) maintaining tension in the cable when the clamp is in a closed position; and (b) for decreasing (or releasing) tension in the cable when the clamp is opened.

In another embodiment a spring clamp connected to a segmented arm that can be made rigid and immobile by releasing pressure on the clamp is provided. In one example (which example is intended to be illustrative and not restrictive), application of hand pressure to the clamp makes the clamp open and the arm flexible, thereby allowing the clamp to be easily repositioned. The clamping device of this embodiment may include a remote release (e.g., at a central anchoring point) that enables a user to render the arm flexible without opening the clamp and releasing the workpiece.

In another embodiment the device includes two clamps and two arms, each meeting, for example, at a central anchoring point (which central anchoring point may also have an independent mechanism for making one or more of the arms flexible). In one example (which example is intended to be illustrative and not restrictive), one clamp could be affixed to a stationary object and the other clamp could be used to hold a workpiece and move the workpiece into any of an essentially infinite number of desirable positions before making the arm(s) rigid. Once in position, the user may easily return one or both of the arms to their rigid state, holding the workpiece in a steady, convenient location.

In other embodiments the device could include any number of flexible arms (which may be connected together, for example, by a common central anchoring point) to create a spiderlike device useful for holding multiple workpieces or the same workpiece in multiple locations. Further, the flexible arm may be connected to any of a variety of clamping devices (e.g., to maintain the entire assembly in place). Further still, a portable stand could be connected to one end of the flexible arm (or, for example, to a central anchoring point in the case of multiple flexible arms) to allow the device to be freestanding.

In another embodiment an apparatus for clamping an object is provided, comprising: at least one clamp with a first gripping element and a second gripping element, which first gripping element and second gripping element are connected by a pivot rod; a biasing element to maintain the clamp in closed position in the absence of applied pressure; and a release mechanism comprising means for maintaining tension in a cable attached to the release mechanism when the clamp is in a closed position, and for releasing tension in the cable when the clamp is opened.

In one example the release mechanism may be attached to the second gripping element of the clamp and may further comprise: a fixed anchor point proximal to the pivot rod; a fixed anchor ring with an opening; a hollow grooved tube extending from the fixed anchor ring to the fixed anchor point, the hollow grooved tube comprising a groove; a first sliding ring to which the cable is attached, the first sliding ring encircling the hollow grooved tube, disposed so that it can slide on the hollow grooved tube; a coil spring connecting the first sliding ring to the fixed anchor ring; a second sliding ring encircling the hollow grooved tube, disposed so that it can slide on the hollow grooved tube between the first sliding ring and the fixed anchor point; and a lever arm connecting the second sliding ring to the first gripping element; wherein, in the absence of pressure, the coil spring serves to maintain tension on the cable so as to render the arm rigid, and wherein application of pressure to the clamp gripping elements causes the lever arm to move the second sliding ring into contact with the first sliding ring so as to compress the spring and relieve tension on the cable, causing the arm to become flexible.

In another example the first sliding ring may further comprise an anchor pin disposed on the inside of the first sliding ring that extends through the groove of the hollow grooved tube and to which the cable is attached.

In another example the release mechanism may be positioned between the first and second gripping elements and may further comprise: a hollow grooved tube extending from the pivot rod to the arm, and terminating with a raised anchor ring, the hollow grooved tube comprising a groove; a first sliding ring to which the cable attaches, the first sliding ring encircling the hollow grooved tube, disposed so that it can slide on the hollow grooved tube; a coil spring connecting the sliding ring to the raised anchor ring; a second sliding ring encircling the hollow grooved tube, disposed so that it can slide on the hollow grooved tube between the first sliding ring and the pivot rod; a first lever arm connecting the second sliding ring to the first gripping element; and a second lever arm connecting the second sliding ring to the second gripping element; wherein, in the absence of pressure, the coil spring serves to maintain tension on the cable so as to render the arm rigid, and wherein application of pressure to the clamp gripping elements causes the first and second lever arms to move the second sliding ring into contact with the first sliding ring so as to compress the spring and relieve tension on the cable, causing the arm to become flexible.

In another example the sliding ring may further comprise an anchor pin disposed on the inside of the sliding ring that extends through the groove of the hollow, grooved tube and to which the cable is attached.

In another example the release mechanism may be positioned between the first and second gripping elements and may further comprise: a hollow grooved tube extending from the pivot rod to the arm, and terminating with a raised anchor ring, the hollow grooved tube comprising a groove; a first sliding ring to which the cable attaches, the first sliding ring encircling the hollow grooved tube, disposed so that it can slide on the hollow grooved tube; a coil spring connecting the sliding ring to the raised anchor ring; a second sliding ring encircling the hollow grooved tube, disposed so that it can slide on the hollow grooved tube between the first sliding ring and the pivot rod; and a horseshoe lever arm connecting the second sliding ring to one of said first or second gripping elements; wherein, in the absence of pressure, the coil spring serves to maintain tension on the cable so as to render the arm rigid, and wherein application of pressure to the clamp gripping elements causes the horseshoe lever arm to move the second sliding ring into contact with the first sliding ring so as to compress the spring and relieve tension on the cable, causing the arm to become flexible.

In another example the sliding ring may further comprise an anchor pin disposed on the inside of the sliding ring that extends through the groove of the hollow, grooved tube and to which the cable is attached.

In another example the second gripping element may include a raised knob at an end opposite from the pivot rod, the raised knob including a bore through which the cable can pass, and wherein the release mechanism may be positioned on the first and second gripping elements and may further comprise: a first bow spring with two ends, the bow spring being fixed at both ends to the first gripping element; a second bow spring attached to the second gripping element so as to face the first bow spring fixed to the first gripping element, the second bow spring being fixed at a first end proximal to the pivot rod; and a third bow spring attached to the second gripping element between the second bow spring and the raised knob, wherein a first end of the third bow spring is fixed proximal to the raised knob, and wherein a second end of the third bow spring is attached to the second end of second bow spring by a sliding connection, the third bow spring including a groove through which the cable can pass, and an anchor point proximal to its second end to which the cable can attach; wherein, in the absence of pressure, the third bow spring maintains tension on the cable so as to render the arm rigid, and wherein application of pressure to the clamp gripping elements causes the first bow spring to depress the second bow spring so as to move the sliding connection towards the raised knob and to compress the third bow spring so as relieve tension on the cable, causing the arm to become flexible.

In another example the second gripping element may further comprise a recessed track in which the sliding connection can move.

In another example the release mechanism may comprise: a first bow spring fixed to the first gripping element; a second bow spring fixed to the second gripping element; a hollow grooved tube connecting the pivot rod to the arm, and terminating with a raised anchor ring; a sliding ring to which the cable attaches, the sliding ring encircling the hollow, grooved tube, disposed so that it can slide on the hollow grooved tube; a coil spring connecting the sliding ring to the raised anchor ring; a first flexible bow spring attached to the hollow grooved tube so as to face the first bow spring, wherein a first end of the first flexible bow spring is fixed proximal to said pivot rod, and wherein a second end of the first flexible bow spring is attached to the sliding ring; and a second flexible bow spring attached to the hollow grooved tube so as to face the second bow spring, wherein a first end of the second flexible bow spring is fixed proximal to the pivot rod, and wherein a second end of the second flexible bow spring is attached to the sliding ring; wherein, in the absence of pressure, the coil spring maintains tension on the cable so as to render the arm rigid, and wherein application of pressure to the clamp gripping elements causes the first bow spring to depress the first flexible bow spring and the second bow spring to depress the second flexible bow spring so as to move the sliding ring towards the anchor ring and to compress the coil spring so as relieve tension on the cable, causing the arm to become flexible.

In another example the first sliding ring may further comprise an anchor pin disposed on the inside of the sliding ring that extends through the groove of the hollow, grooved tube and to which the cable is attached.

In another example the release mechanism may comprise: a first bow spring fixed to the first gripping element; a second bow spring fixed to the second gripping element; a hollow grooved tube connecting the pivot rod to the arm, and terminating with a raised anchor ring; a first sliding ring to which the cable attaches, the first sliding ring encircling the hollow, grooved tube, disposed so that it can slide on the hollow grooved tube; a coil spring connecting the first sliding ring to the raised anchor ring; a second sliding ring encircling the hollow grooved tube, disposed so that it can slide between the first sliding ring and the pivot rod; a first flexible bow spring attached to the hollow grooved tube so as to face the first bow spring, wherein a first end of the first flexible bow spring is fixed proximal to the pivot rod, and wherein a second end of the first flexible bow spring is attached to the second sliding ring; and a second flexible bow spring attached to the hollow grooved tube so as to face the second bow spring, wherein a first end of the second flexible bow spring is fixed proximal to the pivot rod, and wherein a second end of the second flexible bow spring is attached to the second sliding ring; wherein, in the absence of pressure, the coil spring maintains tension on the cable so as to render the arm rigid, and wherein application of pressure to the clamp gripping elements causes the first bow spring to depress the first flexible bow spring and the second bow spring to depress the second flexible bow spring so as to move the second sliding ring into contact with first sliding ring, moving the first sliding ring towards the anchor ring and compressing the coil spring so as relieve tension on the cable, causing the arm to become flexible.

In another example the first sliding ring may further comprise an anchor pin disposed on the inside of the first sliding ring that extends through the groove of the hollow, grooved tube and to which the cable is attached.

In another example the release mechanism may comprise: a hollow grooved tube connecting the pivot rod to the arm, and terminating with a raised anchor ring; a bow spring fixed to the first gripping element and the second gripping element, comprising an opening through which the hollow grooved tube can extend; a first sliding ring to which the cable attaches, the first sliding ring encircling the hollow, grooved tube, disposed so that it can slide on the hollow grooved tube; a coil spring connecting the first sliding ring to the raised anchor ring; and a second sliding ring encircling the hollow grooved tube, disposed so that it can slide between the first sliding ring and the bow spring; wherein, in the absence of pressure, the coil spring maintains tension on the cable so as to render the arm rigid, and wherein application of pressure to the clamp gripping elements causes the bow spring to flex towards the second sliding ring so as to move the second sliding ring into contact with first sliding ring, moving the first sliding ring towards the anchor ring and compressing the coil spring so as relieve tension on the cable, causing the arm to become flexible.

In another example the first sliding ring may further comprise an anchor pin disposed on the inside of the first sliding ring that extends through the groove of the hollow, grooved tube and to which the cable is attached, and wherein the hollow grooved tube may further comprise a flange disposed proximal to the pivot rod so as to limit a backwards flex of the bow spring.

In another example the first and second gripping elements may be connected via a scissors type of connection and the release mechanism may further comprise: a raised knob fixed to an end of the second arm opposite from the pivot rod, the raised knob having an opening through which the cable can pass and serving as a terminus for the arm; a ratchet arm attached to the second gripping element between the raised knob and the pivot rod and extending upward from the second gripping element past said first gripping element; and a cable roller fixed to the first gripping element on a side facing where the ratchet is attached to the second gripping element and adjacent to where the ratchet passes the first gripping element; wherein the cable extends from the raised knob past the cable roller to an end of the ratchet to which the cable is fixed, and wherein the spring maintains the clamp in a closed position in the absence of pressure on the clamp gripping elements and maintains tension on the cable rendering the arm rigid, and applying pressure to pull the gripping elements apart releases tension on the cable rendering the arm flexible.

In another example the release mechanism may be positioned between the first and second gripping elements and may further comprise: a hollow grooved tube extending from the pivot rod to the arm, and terminating with a raised anchor ring, the hollow grooved tube comprising a groove; a sliding ring to which the cable attaches, the sliding ring encircling the hollow grooved tube, disposed so that it can slide on the hollow grooved tube; a coil spring connecting the sliding ring to the raised anchor ring; a first lever arm connecting the sliding ring to the first gripping element; and a second lever arm connecting the sliding ring to the second gripping element; wherein, in the absence of pressure, the coil spring serves to maintain tension on the cable so as to render the arm rigid, and wherein application of pressure to the clamp gripping elements causes the first and second lever arms to move the sliding ring so as to compress the spring and relieve tension on the cable, causing the arm to become flexible.

In another example the sliding ring may further comprise an anchor pin disposed on the inside of the sliding ring that extends through the groove of the hollow grooved tube and to which the cable is attached.

In another example the release mechanism may be attached to the second gripping element of the clamp and may further comprise: a fixed anchor point proximal to the pivot rod; a fixed anchor ring with an opening; a hollow grooved tube extending from the fixed anchor ring to the fixed anchor point, said hollow grooved tube comprising a groove; a sliding ring to which the cable is attached, the sliding ring encircling the hollow grooved tube, disposed so that it can slide on the hollow grooved tube; a coil spring connecting the sliding ring to the fixed anchor ring; and a lever arm connecting the sliding ring to the first gripping element; wherein, in the absence of pressure, the coil spring serves to maintain tension on the cable so as to render the arm rigid, and wherein application of pressure to the clamp gripping elements causes the lever arm to move the sliding ring so as to compress the spring and relieve tension on the cable, causing the arm to become flexible.

In another example the sliding ring may further comprise an anchor pin disposed on the inside of the sliding ring that extends through the groove of the hollow grooved tube and to which the cable is attached.

In another example the release mechanism may comprise: a hollow grooved tube connecting the pivot rod to the arm, and terminating with a raised anchor ring; a bow spring fixed to the first gripping element and the second gripping element, comprising an opening through which the hollow grooved tube can extend; a sliding ring to which the cable attaches, said sliding ring encircling the hollow, grooved tube, disposed so that it can slide on the hollow grooved tube; and a coil spring connecting the sliding ring to the raised anchor ring; wherein, in the absence of pressure, the coil spring maintains tension on the cable so as to render the arm rigid, and wherein application of pressure to the clamp gripping elements causes the bow spring to flex towards the sliding ring so as to move the sliding ring and compress the coil spring so as relieve tension on the cable, causing the arm to become flexible.

In another example the sliding ring may further comprise an anchor pin disposed on the inside of the sliding ring that extends through the groove of the hollow, grooved tube and to which the cable is attached, and wherein the hollow grooved tube may further comprise a flange disposed proximal to the pivot rod so as to limit a backwards flex of the bow spring.

In another example the apparatus may further comprise at least one arm comprising a flexible casing that encases the cable.

In another example the flexible casing may comprise a plurality of tubular, cone shaped segments.

In another example the tubular cone shaped segments may be open at a wide end and closed at a narrow end, and the narrow end may be penetrated by a bore through which the cable can pass.

In another example the apparatus may further comprise a central anchor point to which one end of the at least one arm terminates, the central anchor point may further comprise a cylindrical section and a toggle means to which the cable attaches, a first end of the toggle means being hingedly attached to the cylindrical section, wherein when the toggle means is in a locked position the cable is under tension, rendering the arm rigid, and when the toggle means is in an unlocked position, tension in the cable is released rendering the arm flexible.

In another example the toggle means may be held in the locked position by a spring disposed between the toggle means and the cylindrical section, and wherein the toggle means is depressed into the unlocked position.

In another example the toggle means may include a protuberance proximal to the first end, and the cylindrical section may include a depression disposed to receive the protuberance when the toggle means is in the locked position, the depression shaped to hold the toggle means in the locked position until the toggle means is moved to the unlocked position.

In another example the apparatus may further comprise a plurality of clamps and a plurality of arms, each clamp being connected to the central anchor point by one of the arms, each arm encasing a cable that connects from the clamp to the central anchor point, the central anchor point further comprising a plurality of toggle means so that each cable connects to one of the plurality of toggle means.

In another embodiment an apparatus for clamping an object is provided, comprising: a clamp with a first gripping element and a second gripping element, which first gripping element and the second gripping element are connected by a pivot rod with a biasing element to maintain the clamp in closed position in the absence of applied pressure; an arm comprising a cable encased by a plurality of tubular, cone shaped segments, each tubular cone shaped segment being open at a wide end and closed at a narrow end, the closed end being penetrated by a bore through which the cable can pass; and a release mechanism attached to the second gripping element, the cable attaching to the release mechanism; wherein the release mechanism further comprises: a fixed anchor point proximal to the pivot rod; a fixed anchor ring with an opening; a hollow grooved tube extending from the fixed anchor ring to the fixed anchor point; a first sliding ring with an anchor pin to which the cable is attached, said first sliding ring encircling the hollow, grooved tube, disposed so that it can slide on the hollow grooved tube; a coil spring connecting the first sliding ring to the fixed anchor ring; a second sliding ring encircling the hollow, grooved tube, disposed so that it can slide on the hollow grooved tube between the first sliding ring and the fixed anchor point; and a lever arm connecting the second sliding ring to the first gripping element; wherein, in the absence of pressure, the coil spring serves to maintain tension on the cable so as to render the arm rigid, and wherein application of pressure to the clamp gripping elements causes the lever arm to move the second sliding ring into contact with the first sliding ring so as to compress the spring and relieve tension on the cable, causing the arm to become flexible.

In another embodiment an apparatus for clamping an object is provided, comprising: a clamp with a first gripping element and a second gripping element, which first gripping element and second gripping element are connected by a pivot rod with a biasing element to maintain the clamp in closed position in the absence of applied pressure; an arm comprising a cable encased by a plurality of tubular, cone shaped segments, each tubular cone shaped segment being open at a wide end and closed at a narrow end, the closed end being penetrated by a bore through which the cable can pass; and a release mechanism positioned between the first and second gripping elements that further comprises: a hollow grooved tube extending from the pivot rod to the arm, and terminating with a raised anchor ring; a first sliding ring to which the cable attaches, the first sliding ring encircling the hollow, grooved tube, disposed so that it can slide on the hollow grooved tube; a coil spring connecting the sliding ring to the raised anchor ring; a second sliding ring encircling the hollow, grooved tube, disposed so that it can slide on the hollow grooved tube between the first sliding ring and the pivot rod; a first lever arm connecting the second sliding ring to the first gripping element; and a second lever arm connecting the second sliding ring to the second gripping element; wherein, in the absence of pressure, the coil spring serves to maintain tension on the cable so as to render the arm rigid, and wherein application of pressure to the clamp gripping elements causes the first and second lever arms to move the second sliding ring into contact with the first sliding ring so as to compress the spring and relieve tension on the cable, causing the arm to become flexible.

In another embodiment an apparatus for clamping an object is provided, comprising: an arm comprising a cable encased by a plurality of tubular, cone shaped segments, each tubular cone shaped segment being open at a wide end and closed at a narrow end, the closed end being penetrated by a bore through which the cable can pass; a clamp with a first gripping element and a second gripping element, which first gripping element and second gripping element are connected by a pivot rod with a biasing element to maintain the clamp in closed position in the absence of applied pressure, wherein the second gripping element includes a raised knob at an end opposite from the pivot rod, the raised knob including a bore through which the cable can pass; and a release mechanism positioned on the first and second gripping elements that comprises: a first bow spring with two ends, each of which ends is fixed to the first gripping element; a second bow spring attached to the second gripping element so as to face the first bow spring fixed to the first gripping element, the second bow spring being fixed at a first end proximal to the pivot rod; and a third bow spring attached to the second gripping element between the second bow spring and the raised knob; wherein a first end of the third bow spring is fixed proximal to the raised knob, and wherein a second end of the third bow spring is attached to the second end of second bow spring by a sliding connection, the third bow spring including a groove through which the cable can pass and an anchor point proximal to its second end to which the cable can attach; wherein, in the absence of pressure, the third bow spring maintains tension on the cable so as to render the arm rigid, and wherein application of pressure to the clamp gripping elements causes the first bow spring to depress the second bow spring so as to move the sliding connection towards the raised knob and to compress third bow spring so as relieve tension on the cable, causing the arm to become flexible.

In another embodiment an apparatus for clamping an object is provided, comprising: a clamp with a first gripping element and a second gripping element, which first gripping element and second gripping element are connected by a pivot rod with a biasing element to maintain the clamp in closed position in the absence of applied pressure; an arm comprising a cable encased by a plurality of tubular, cone shaped segments, each tubular cone shaped segment being open at a wide end and closed at a narrow end, the closed end being penetrated by a bore through which the cable can pass; and a release mechanism that comprises: a first bow spring fixed to the first gripping element; a second bow spring fixed to the second gripping element; a hollow grooved tube connecting the pivot rod to the arm, and terminating with a raised anchor ring; a sliding ring to which the cable attaches, the sliding ring encircling the hollow, grooved tube, disposed so that it can slide on the hollow grooved tube; a coil spring connecting the sliding ring to the raised anchor ring; a first flexible bow spring attached to the hollow grooved tube so as to face the first bow spring, wherein a first end of the first flexible bow spring is fixed proximal to the pivot rod and wherein a second end of the first flexible bow spring is attached to the sliding ring; and a second flexible bow spring attached to the hollow grooved tube so as to face the second bow spring, wherein a first end of the second flexible bow spring is fixed proximal to the pivot rod and wherein a second end of the second flexible bow spring is attached to the sliding ring; wherein, in the absence of pressure, the coil spring maintains tension on the cable so as to render the arm rigid, and wherein application of pressure to the clamp gripping elements causes the first bow spring to depress the first flexible bow spring and the second bow spring to depress the second flexible bow spring so as to move the sliding ring towards the anchor ring and to compress the coil spring so as relieve tension on the cable, causing the arm to become flexible.

In another embodiment an apparatus for clamping an object is provided, comprising: a clamp with a first gripping element and a second gripping element, which first gripping element and second gripping element are connected by a pivot rod and include a biasing element to maintain the clamp in closed position in the absence of applied pressure; wherein the first and second gripping elements are connected via a scissors type of connection; an arm comprising a cable encased by a plurality of tubular, cone shaped segments, each tubular cone shaped segment being open at a wide end and closed at a narrow end, the closed end being penetrated by a bore through which the cable can pass; and a release mechanism comprising: a raised knob fixed to an end of the second arm opposite from the pivot rod, the raised knob having an opening through the cable can pass and serving as a terminus for the arm; a ratchet arm attached to the second gripping element between the raised knob and the pivot rod and extending upward from the second gripping element past the first gripping element; and a cable roller fixed to the first gripping element on a side facing where the ratchet is attached to the second gripping element and adjacent to where the ratchet passes said first gripping element; wherein the cable extends from the raised knob past the cable roller to an end of the ratchet to which the cable is fixed, and wherein the spring maintains the clamp in a closed position in the absence of pressure on the clamp gripping elements and maintains tension on the cable rendering the arm rigid, and applying pressure to pull the gripping elements apart releases tension on the cable rendering the arm flexible.

In another embodiment an apparatus for clamping an object is provided, comprising: a clamp with a first gripping element and a second gripping element, which first gripping element and second gripping element are connected by a pivot rod with a biasing element to maintain the clamp in closed position in the absence of applied pressure; an arm comprising a cable encased by a plurality of tubular, cone shaped segments, each tubular cone shaped segment being open at a wide end and closed at a narrow end, the closed end being penetrated by a bore through which the cable can pass; and a release mechanism comprising: a first bow spring fixed to the first gripping element; a second bow spring fixed to the second gripping element; a hollow grooved tube connecting the pivot rod to the arm, and terminating with a raised anchor ring; a first sliding ring to which the cable attaches, the first sliding ring encircling the hollow, grooved tube, disposed so that it can slide on the hollow grooved tube; a coil spring connecting the first sliding ring to the raised anchor ring; a second sliding ring encircling the hollow grooved tube, disposed so that it can slide between the first sliding ring and the pivot rod; a first flexible bow spring attached to the hollow grooved tube so as to face the first bow spring, wherein a first end of the first flexible bow spring is fixed proximal the said pivot rod and wherein a second end of the first flexible bow spring is attached to the second sliding ring; and a second flexible bow spring attached to the hollow grooved tube so as to face the second bow spring, wherein a first end of the second flexible bow spring is fixed proximal to the pivot rod and wherein a second end of the second flexible bow spring is attached to the second sliding ring; wherein, in the absence of pressure, the coil spring maintains tension on the cable so as to render the arm rigid, and wherein application of pressure to the clamp gripping elements causes the first bow spring to depress the first flexible bow spring and the second bow spring to depress the second flexible bow spring so as to move the second sliding ring into contact with first sliding ring, moving the first sliding ring towards the anchor ring and compressing the coil spring so as relieve tension on the cable, causing the arm to become flexible.

In another embodiment an apparatus for clamping an object is provided, comprising: a clamp with a first gripping element and a second gripping element, which first gripping element and second gripping element are connected by a pivot rod with a biasing element to maintain the clamp in closed position in the absence of applied pressure; an arm comprising a cable encased by a plurality of tubular, cone shaped segments, each tubular cone shaped segment being open at a wide end and closed at a narrow end, the closed end being penetrated by a bore through which the cable can pass; and a release mechanism comprising: a hollow grooved tube connecting the pivot rod to the arm, and terminating with a raised anchor ring; a bow spring fixed to the first gripping element and the second gripping element, comprising an opening through which the hollow grooved tube can extend; a first sliding ring to which the cable attaches, the first sliding ring encircling the hollow, grooved tube, disposed so that it can slide on the hollow grooved tube; a coil spring connecting the first sliding ring to the raised anchor ring; and a second sliding ring encircling the hollow grooved tube, disposed so that it can slide between the first sliding ring and the bow spring; wherein, in the absence of pressure, the coil spring maintains tension on the cable so as to render the arm rigid, and wherein application of pressure to the clamp gripping elements causes the bow spring to flex towards the second sliding ring so as to move the second sliding ring into contact with first sliding ring, moving the first sliding ring towards the anchor ring and compressing the coil spring so as relieve tension on the cable, causing the arm to become flexible.

In one example the apparatus may further comprise a central anchor point to which one end of the arm terminates and the central anchor point may further comprise a cylindrical section and a toggle means to which the cable attaches, a first end of the toggle means being hingedly attached to the cylindrical section, wherein when the toggle means is in a locked position the cable is under tension, rendering the arm rigid, and when the toggle means is in an unlocked position, tension in the cable is released rendering the arm flexible.

In another example the toggle arm may be held in the locked position by a spring disposed between the toggle arm and the cylindrical section, and wherein the toggle arm may be depressed into the unlocked position.

In another example the toggle arm may include a protuberance proximal to the first end, and the cylindrical section may include a depression disposed to receive the protuberance when the toggle is in the locked position, the depression being shaped to hold the toggle arm in the locked position until the toggle arm is moved to the unlocked position.

In another example the apparatus may further comprise a plurality of clamps and a plurality of arms, each clamp being connected to the central anchor point by one of the arms, each arm encasing a cable that connects from the clamp to the central anchor point, the central anchor point further comprising a plurality of toggle means so that each cable connects to one of the plurality of toggle means.

Referring now to FIG. 1, this FIG. depicts a perspective view of an embodiment of a coil spring clamp 100 of the invention. The clamp of this embodiment includes a first gripping element or handle 101 and a second gripping element or handle 102 connected by a center pivot rod 103. A biasing element such as a pivot spring 104 encircling pivot rod 103 serves to maintain the clamp in a closed position as shown, until pressure is applied to the handles 101 and 102. The first handle 101 has an underside 121 that faces an underside 122 of second handle 102.

The clamp attaches to an arm encasing a cable. One embodiment of such an arm includes a cable 112 encased in a plurality of short, tubular cone-shaped segments 111 which terminate at a fixed anchor ring 110 that is attached to the underside 122 of second handle 102. In one example (which example is intended to be illustrative and not restrictive), the cable 112 of the invention can be manufactured from a metallic, plastic, or any other suitable material. The cable 112 need not have a solid cross section, and can be hollow. Each tubular cone-shaped segment 111 is open at a wide end and closed at a narrow end, with the closed end being penetrated by a bore at the center through which the cable 112 can pass.

Figure 2A:
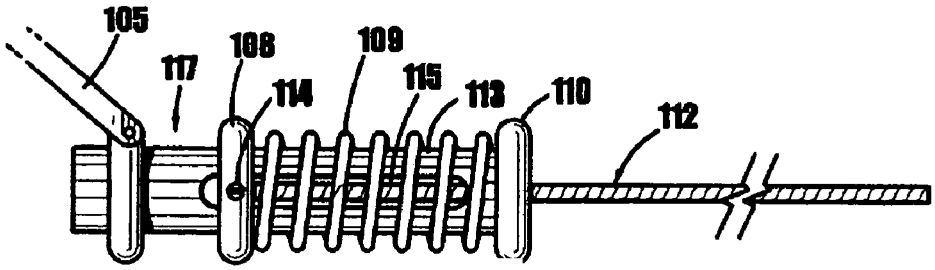
FIG. 2*a* is a detailed side view of the spring mechanism of the clamp depicted in FIG. 1.
Figure 2B:
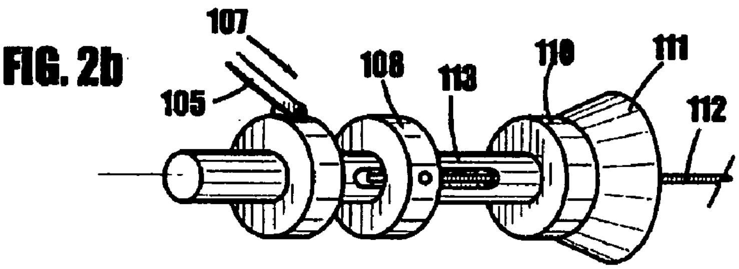
FIG. 2*b* is a perspective view of the mechanism of FIG. 2*a* with the spring removed.
Figure 2C:
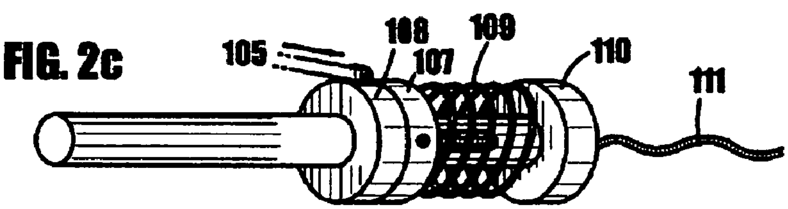
FIG. 2*c* is a perspective view of the mechanism of FIG. 2*a* depicting the two rings in an engaged position compressing the spring.
Figure 2D:
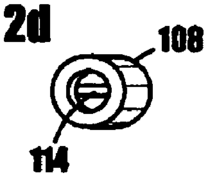
FIG. 2*d* is a perspective view of a sliding ring with an anchor pin.

Attached between the fixed anchor ring 110 and a fixed anchor point 106 that is also attached to the underside 122 of second handle 102 is a hollow grooved tube 113. The cable 112 continues through an opening in fixed anchor ring 110 into the hollow, grooved tube 113 and connects to first sliding ring 108. As shown in FIG. 2*a*, the first sliding ring 108 is disposed so that it encircles hollow grooved tube 113, and includes an anchor pin 114 that extends laterally through the groove 115 of hollow grooved tube 113. A view of first sliding ring with the anchor pin is depicted in FIG. 2*d*. Cable 112 attaches to anchor pin 114. A coil spring 109 serves to separate first sliding ring 108 from fixed anchor ring 110.

Referring again to FIG. 1, pivotally connected to the underside 121 of first handle 101 is a connecting arm 105, which is also pivotally connected to a second sliding ring 107 disposed to encircle hollow grooved tube 113. When the handles 101 and 102 are not under pressure, the clamp is closed, there is a space 117 between second sliding ring 107 and first sliding ring 108 (see FIG. 2*a*), and spring 109 maintains a separation between first sliding ring 108 and fixed anchor ring 110. By so doing, the coil spring 109 places the cable 112 under tension, causing axial compression of the tubular cone-shaped segments 111 against each other causing the arm of device 100 to remain in a rigid, fixed position.

When pressure is applied to the handles 101 and 102, the clamp begins to open, lever arm 105 slides so as to cause second sliding ring 107 to move towards first sliding ring 108, closing space 117. The movement of second sliding ring 107 towards first sliding ring 108 is depicted in FIG. 2*b*. As pressure continues to be applied to the handles 101 and 102, second sliding ring 107 engages first sliding ring 108 and moves it towards fixed anchor ring 110, compressing coil spring 109, which in turn relieves the tension on cable 112, causing it to go slack, a process depicted in FIG. 2*c*. This enables the tubular cone-shaped segments 111 to separate (or at least be under less frictional engagement with one another) and the arm to become flexible. The existence of the space 117 allows the clamp handles to be squeezed together a certain amount without losing the rigidity of the arm. This allows a user to clamp or unclamp an object without necessarily causing movement of the arm. One must squeeze the handles 101 and 102 (in one example, almost fully) to cause the arm to become flexible.

Figure 10:
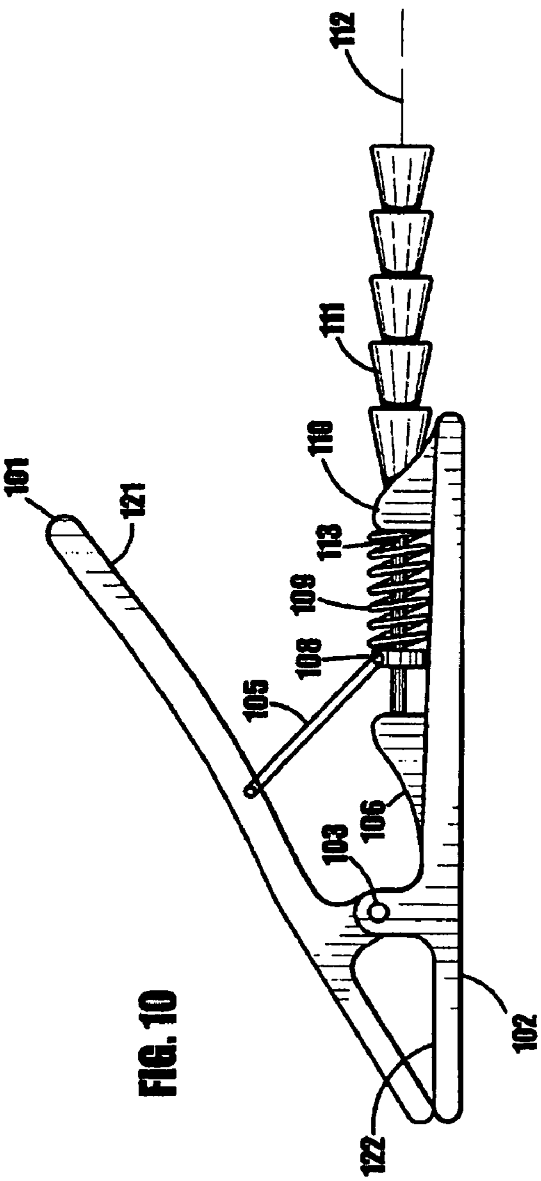
FIG. 10 is a side view of a coil spring clamp embodiment of the present invention.

Another embodiment utilizing only one sliding ring and thus lacking the space between sliding rings is depicted in FIG. 10. In this embodiment, lever arm 105 connects directly to first sliding ring 108. Application of pressure to handles 101, 102 causes lever arm 105 to move sliding ring 108 towards fixed anchor ring 110, compressing coil spring 109, relieving tension on cable 112 (thus rendering the arm flexible). In this embodiment, the arm will loose its rigidity essentially immediately as a user opens the clamp.

Figure 7:
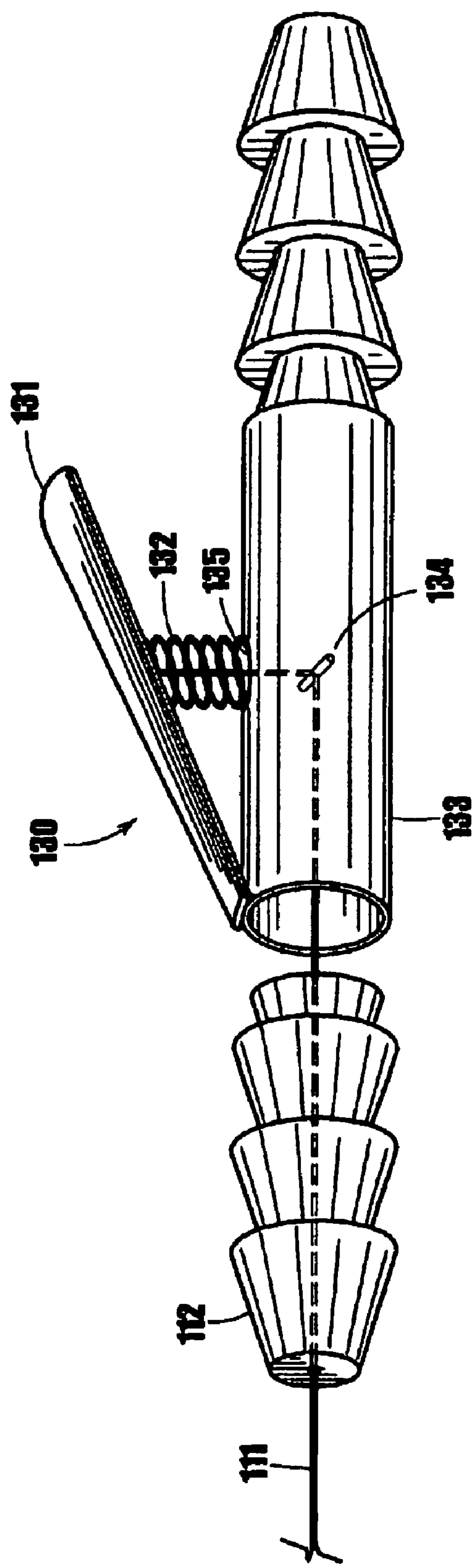
FIG. 7 is a perspective view of a central anchoring point according to an embodiment of the present invention.

In another embodiment, there may be disposed at the end of the flexible arm opposite of the clamp a central anchoring point 130. The central anchoring point 130 is depicted in greater detail in FIG. 7. The tubular cone-shaped segments 111 encasing cable 112 terminate at a hollow cylindrical segment 133, which also encases the cable 112. In one example of the central anchor point 130 (which example is intended to be illustrative and not restrictive), cable 112 turns on a turning rod 134 attached on the inside of the cylindrical segment 133, emerges through opening 135 and is attached to lever arm 131. One end of lever arm 131 is hingedly attached to cylindrical segment 133, while the other end is held apart from the cylindrical segment 133 by spring 132, which also serves to maintain the tension on cable 112. Compressing lever arm 131 relieves the tension on cable 112, causing the arm to become flexible without releasing the object held by the clamp. This allows the arm to be mobile, independent of the clamp.

Figure 8A:
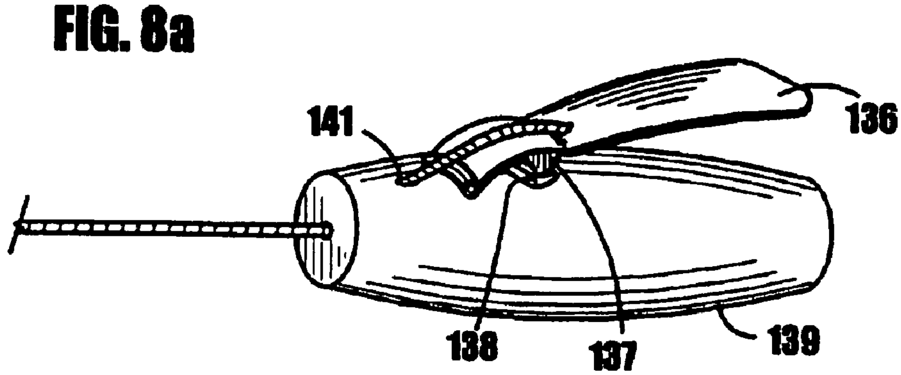
FIG. 8*a* depicts another perspective view of a central anchoring point according to an embodiment of the present invention (this view shows a locked position)
Figure 8B:
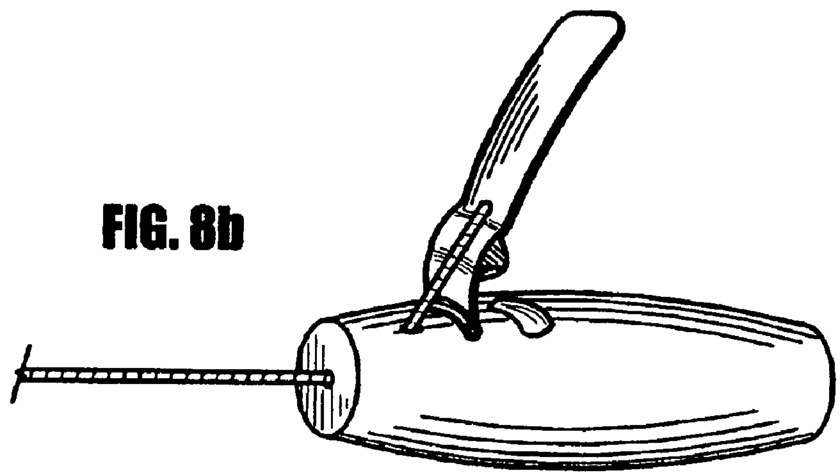
FIG. 8*b* depicts the central anchoring point embodiment of FIG. 8*a* (in an unlocked position)

Another variation of the central anchor point 130 is depicted in FIGS. 8*a* and 8*b*. This variation includes a solid cylindrical segment 139. The cable 112 is threaded through a bore in the cylindrical segment 139, emerging at opening 141 and attaching to toggle arm 136. Toggle arm 136, which is also hingedly attached at one end to cylindrical segment 139 has a protuberance 137 near the attached end on the side opposite where cable 112 is attached. This protuberance 137 is shaped to fit into a depression 138 on the side of cylindrical segment 139 when the toggle arm 136 is moved to a closed, locked position, as shown in FIG. 8*a*. When the toggle arm 136 is locked, applying tension to cable 112, protuberance 136 will hold the toggle arm 136 in that position until unlocked by a user. FIG. 8*b* shows the toggle arm 136 in an open, unlocked position, relieving tension on cable 112.

Figure 8C:
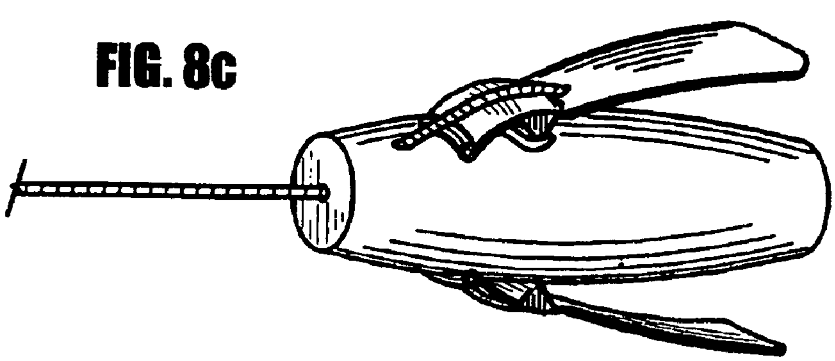
FIG. 8*c* depicts a dual central anchoring point according to an embodiment of the present invention.
Figure 9:
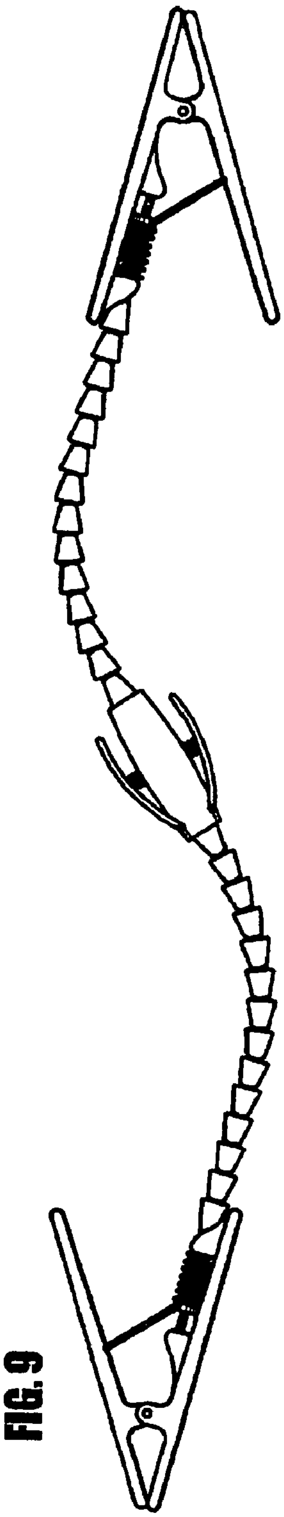
FIG. 9 is a side view of an embodiment of the present invention in which two spring clamps are connected to a common central anchoring point.

FIG. 8*c* depicts another variation of the central anchor point 130 that is connected to two flexible arms, with toggle arms for each flexible arm disposed on opposite sides of the anchor point. A top view of two flexible arms attached to a common central anchor point is shown in FIG. 9. The central anchor point 130 can be fixed to a supporting or stationary object, such as, for example, a table-top or a wall.

Figure 3:
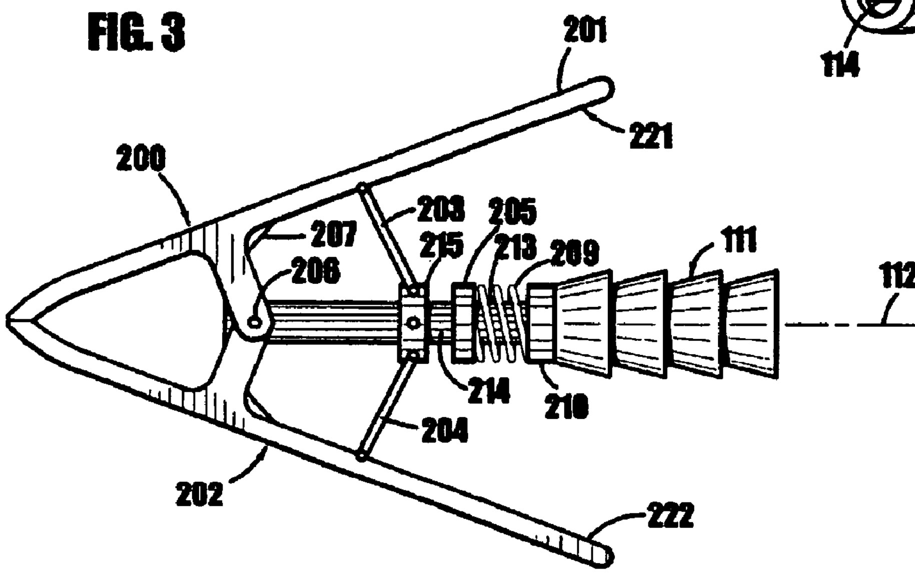
FIG. 3 is a perspective view of a spring clamp embodiment of the present invention.

Of course, other embodiments of the clamping device of the invention are possible. For example, FIG. 3 depicts another embodiment of the coil spring clamp. The clamp 200 of this embodiment includes a first handle 201 and a second handle 202 connected by a center pivot rod 206. A biasing element such as a pivot spring 207 encircling pivot rod 206 serves to maintain the clamp in a closed position as shown until pressure is applied to the handles 201 and 202. The first handle 201 has an underside 221 that faces an underside 222 of second handle 202.

Attached to the center pivot rod 206 is one end of a hollow, grooved tube 213. Attached to the other end of hollow, grooved tube 213 is a terminating ring 210 that serves as a terminus for the tubular cone-shaped segments 111 encasing cable 112. A first sliding ring 205 encircles hollow, grooved tube 213, and includes an anchor pin (not shown) that extends laterally through groove 211 of hollow grooved tube 213. The cable 112 continues through an opening in the terminating ring 210 and through the hollow, grooved tube 213 to be attached to the anchor pin of sliding ring 205. A coil spring 209 serves to separate first sliding ring 205 from terminating ring 210. In addition, disposed upon hollow, grooved tube 213 between the first sliding ring 205 on the pivot rod 206 is a second sliding ring 215.

Pivotally connected to the underside 221 of first handle 201 is a first connecting arm 203, the other end of which is pivotally connected to second sliding ring 215. Similarly, pivotally connected to the underside 222 of second handle 202 is a second connecting arm 204, which is also pivotally connected to second sliding ring 215. When the handles 201 and 202 are not under pressure, the clamp is closed and there is a space 214 between first sliding ring 205 and second sliding ring 215, and spring 209 maintains a separation between first sliding ring 205 and terminating ring 210. By so doing, the coil spring 209 places the cable 112 under tension, causing axial compression of the tubular cone-shaped segments 111 against each other causing the arm of device 200 to remain in a rigid, fixed position.

When pressure is applied to the handles 201 and 202, the clamp begins to open, lever arms 203 and 204 move so as to cause second sliding ring 215 to move towards first sliding ring 205. As pressure continues to be applied to the handles 201 and 202, second sliding ring 215 engages first sliding ring 205 and moves it towards fixed anchor ring 210, compressing coil spring 209, which in turn relieves the tension on cable 112, causing it to go slack. This enables the tubular cone-shaped segments 111 to separate (or at least be under less frictional engagement with one another) and the arm to become flexible.

Figure 12:
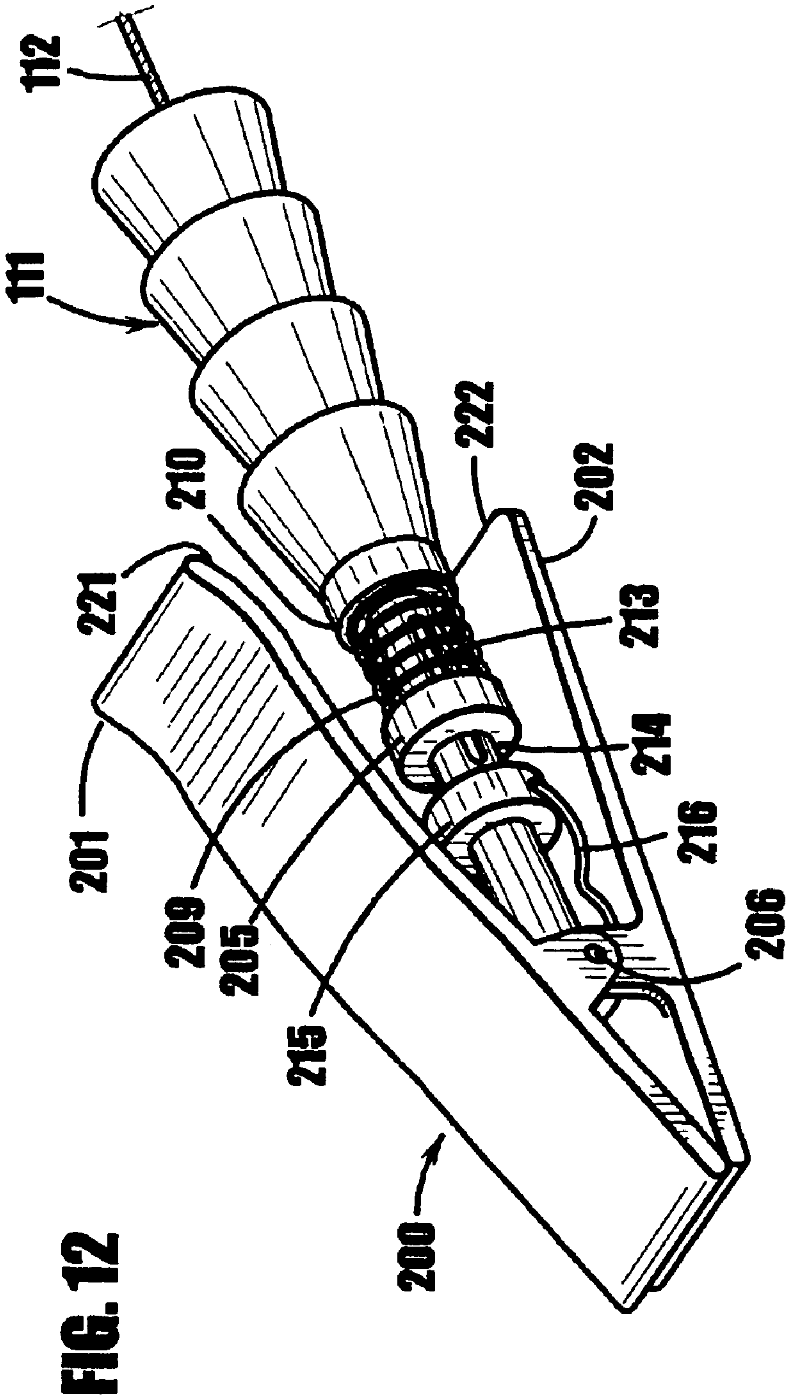
FIG. 12 is a perspective view of a coil spring clamp embodiment of the present invention.

A variation of this embodiment utilizing only one lever arm is depicted in FIG. 12. In this embodiment, a horseshoe lever arm 216 replaces lever arms 203 and 204. The horseshoe lever arm connects one of the handles to the second sliding ring 215. Alternatively, the single horseshoe lever arm could be replaced by two separate lever arms wherein both lever arms connect to the underside of the same gripping element. Although FIG. 12 depicts the second handle 202 as being connected to the second sliding ring, the connection can easily be, for example, to the first handle 201. Again, application of pressure to handles 201 and 202 causes the horseshoe lever arm 216 to move second sliding ring 215 to engage first sliding ring 205 towards fixed anchor ring 210, compressing coil spring 209, relieving tension on cable 112 thus rendering the arm flexible.

Figure 11:
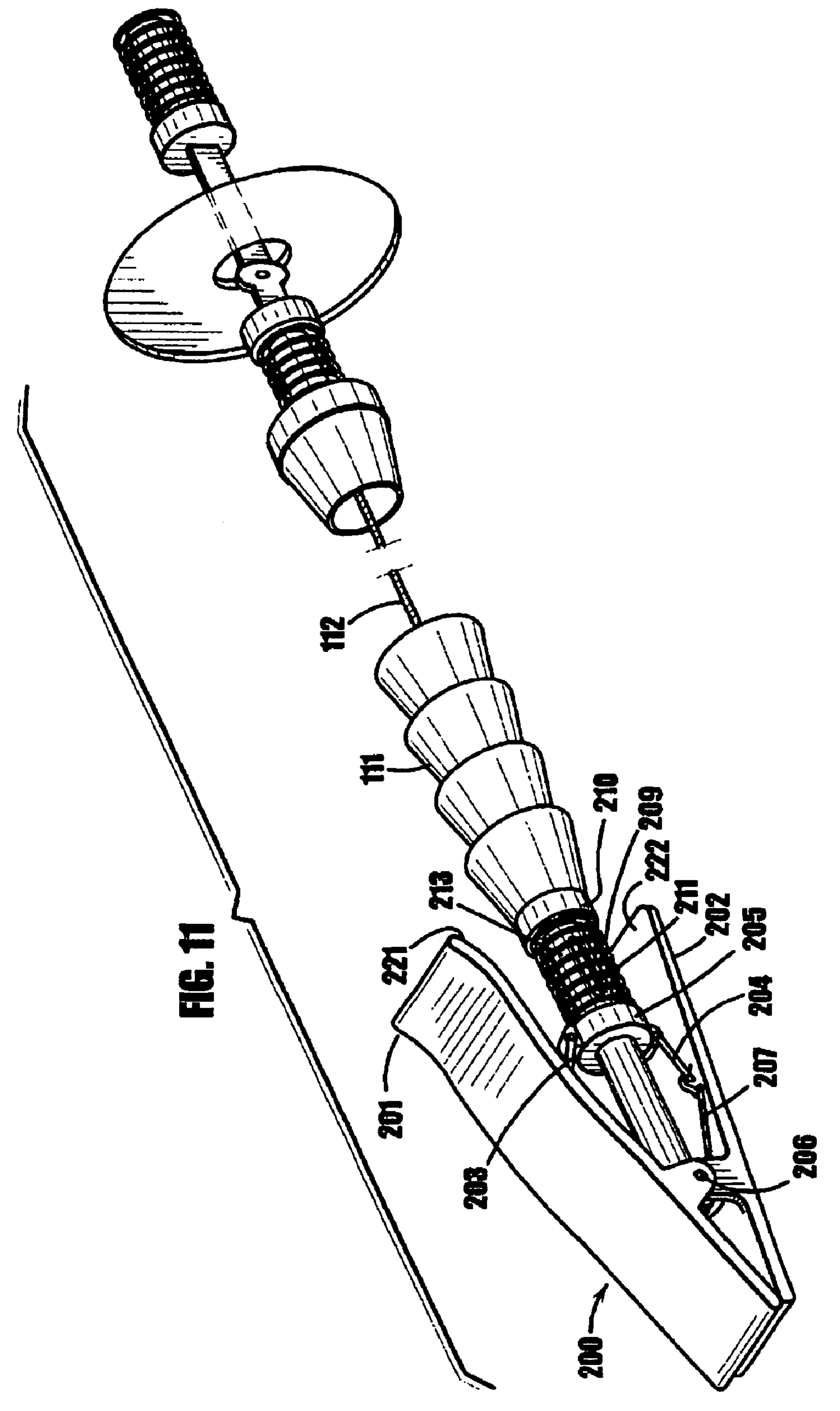
FIG. 11 is a perspective view of a coil spring clamp embodiment of the present invention.

As with the case of the first coil spring embodiment, there is a another embodiment, depicted in FIG. 11, that utilizes only one sliding ring and thus lacks the space between the first and second sliding rings. In this embodiment, lever arms 203 and 204 connect directly to the first sliding ring 205. Application of pressure to handles 201 and 202 causes lever arms 203 and 204 to move sliding ring 205 towards fixed anchor ring 210, compressing coil spring 209, relieving tension on cable 112 thus rendering the arm flexible. In this embodiment, the arm will loose its rigidity essentially immediately as a user opens the clamp.

Figure 4A:
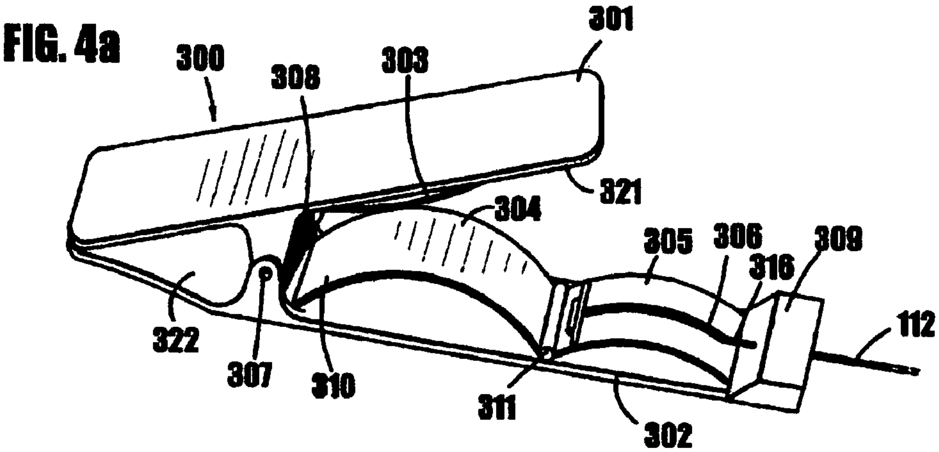
FIG. 4*a* is a perspective view of a bow spring clamp embodiment of the present invention.
Figure 4B:
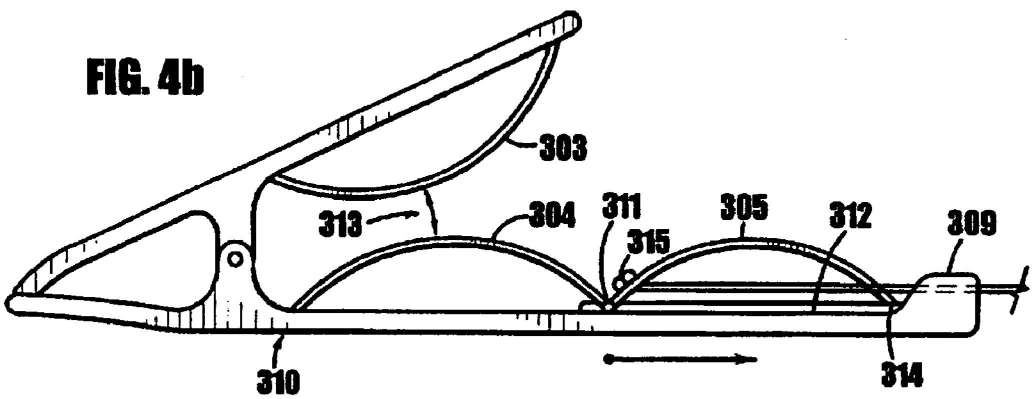
FIG. 4*b* is a side view of the clamp of FIG. 4*a;*

FIGS. 4*a* and 4*b* depict a bow spring embodiment of the clamp of the invention. The clamp 300 of this embodiment includes a first handle 301 and a second handle 302 connected by a center pivot rod 307. A biasing element such as a pivot spring 308 encircling pivot rod 307 serves to maintain the clamp in a closed position as shown until pressure is applied to the handles 301 and 302. The first handle 301 has an underside 321 that faces an underside 322 of second handle 302. At the end of the second handle 302 opposite the center pivot rod 307 is a raised knob 309 that serves as a terminus for the tubular cone-shaped segments 111, not shown in this figure for clarity. The raised knob 309 has a bore 316 through which the cable 112 passes.

Attached to the underside 321 of first handle 301 is a first bow spring 303. This bow spring 303 is fixed at both ends and thus has little ability to flex. Attached to the underside 322 of second handle 302 is a second bow spring 304. One end 310 of second bow spring 304 is fixed to the underside 322 of second handle 302 proximal to the center pivot rod 307, while the other end is connected at a sliding connecting point 311 to a third bow spring 305. The sliding connecting point 311 slides in a track 312 that is recessed in the underside 322 of second handle 302.

Figure 4C:
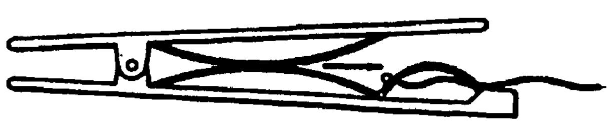
FIG. 4*c* is a side view of the clamp of FIG. 4*a;*

The third bow spring is fixed at fixed end 314 to the raised knob 309, and includes a groove 306 through which the cable 112 can pass. The cable is fixed to the third bow spring 306 at anchor point 315. When pressure is applied to the handles 301 and 302, first bow spring 303 comes into contact with second bow spring 304 and depresses it, causing the sliding connecting point 311 to slide in track 312 towards fixed end 314. This releases tension on cable 112, allowing it to loosen and to make the arm flexible, as shown in FIG. 4*c*. Release of pressure reverses the process and causes the cable to tighten to make the arm rigid.

The degree of compression required to loosen the arm and the magnitude of the space 313 can be adjusted by a simple screw mechanism similar to the adjustment used on the handbrakes of a bicycle.

Another variation of the bow spring embodiment of the clamp is depicted in FIG. 5. The clamp 400 of this embodiment includes a first handle 401 and a second handle 402 connected by a center pivot rod 411. A biasing element, not shown for clarity, encircles the center pivot rod 411 and serves to maintain the clamp in a closed position as shown until pressure is applied to the handles 401 and 402. The first handle 401 has an underside 421 that faces an underside 422 of second handle 402.

Attached to the underside 421 of first handle 401 is a first bow spring 403, fixed at both ends to limit its ability to flex. Similarly, attached to the underside 422 of second handle 402 is a second bow spring 404, also fixed at both ends to limit its ability to flex. Attached to the center pivot rod 411 of the clamp is one end of a hollow grooved tube 409. On the other end of the hollow grooved tube 409 opposite of the center pivot rod 411 is a flange or terminating ring 410 that serves as a terminus for the tubular cone-shaped segments 111, not shown in this figure for clarity.

A sliding ring 407 encircles hollow, grooved tube 409, and includes an anchor pin (not shown) that extends laterally through groove 414 of hollow grooved tube 409. The cable, not shown for clarity, continues through the hollow, grooved tube 409 to be attached to the anchor pin of sliding ring 407. A coil spring 408 serves to separate sliding ring 407 from terminating ring 410.

Attached to the hollow grooved tube 409 on a side opposite the first bow spring 403 is a first flexible bow spring 405. One end of the first flexible bow spring 405 is fixed to the hollow grooved tube 409 at a point 412 proximal to the center pivot rod 411, whereas the other end of the first flexible bow spring 405 is attached to sliding ring 407. Similarly, attached to the hollow grooved tube 409 on a side opposite the second bow spring 404 is a second flexible bow spring 406. One end of the second flexible bow spring 406 is fixed to the hollow grooved tube 409 at a point 413 proximal to the center pivot rod 411, whereas the other end of the second flexible bow spring 406 is attached to sliding ring 407.

When pressure is applied to the handles 401 and 402, first bow spring 403 comes into contact with first flexible bow spring 404, while second bow spring 404 comes into contact with second flexible bow spring 406. The pressure applied by bow springs 403 and 404, respectively, to flexible bow springs 405 and 406 causes the flexible springs 405 and 406 to be depressed, causing the sliding ring 407 to slide in groove 414 towards terminating ring 410, compressing spring 408. This releases tension on the cable, allowing it to loosen and to make the arm flexible. Release of pressure reverses the process and causes the cable to tighten to make the arm rigid.

As with the first bow spring embodiment, the degree of compression required to loosen the arm and the magnitude of the spaces 415 and 416 can be adjusted by a simple screw mechanism similar to the adjustment used on the handbrakes of a bicycle.

Figure 13A:
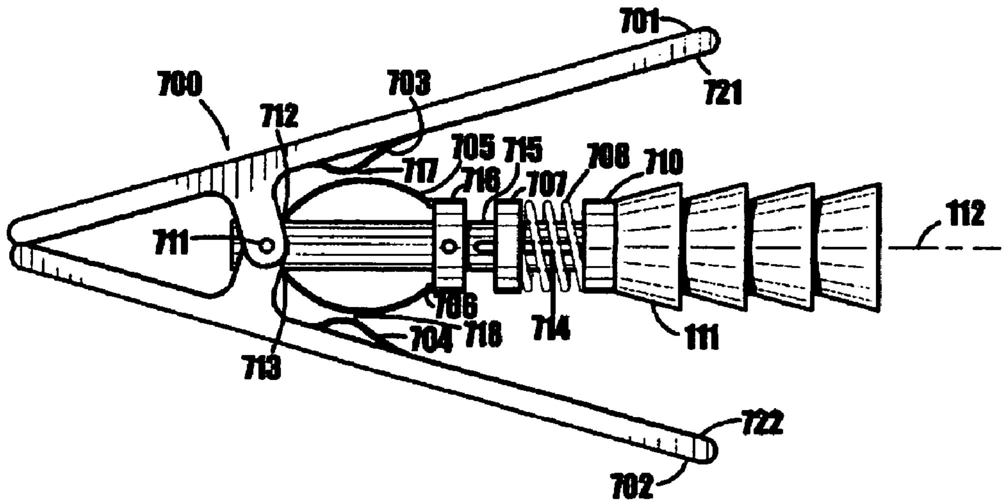
FIG. 13*a* is a side view of a bow spring clamp embodiment of the present invention.
Figure 13B:
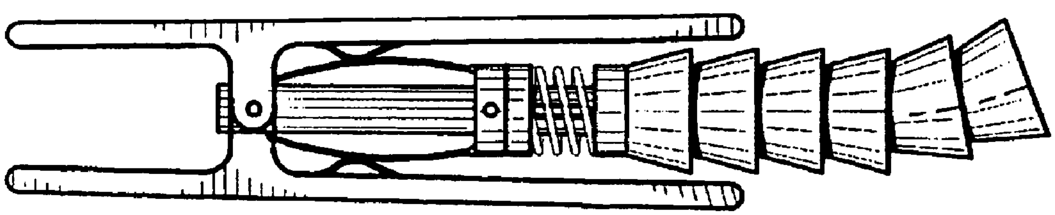
FIG. 13*b* is a side view of the bow spring clamp embodiment of FIG. 13*a;*

Another variation of the bow spring embodiment of the clamp is depicted in FIGS. 13*a* and 13*b*. The clamp 700 of this embodiment includes a first handle 701 and a second handle 702 connected by a center pivot rod 711. A biasing element, not shown for clarity, encircles the center pivot rod 711 and serves to maintain the clamp in a closed position as shown until pressure is applied to the handles 701 and 702. The first handle 701 has an underside 721 that faces an underside 722 of second handle 702.

Attached to the underside 721 of first handle 401 is a first bow spring 703, fixed at both ends to limit its ability to flex. Similarly, attached to the underside 722 of second handle 702 is a second bow spring 704, also fixed at both ends to limit its ability to flex. Attached to the center pivot rod 711 of the clamp is one end of a hollow grooved tube 709. On the other end of the hollow grooved tube 709 opposite of the center pivot rod 711 is a flange or terminating ring 710 that serves as a terminus for the tubular cone-shaped segments 111.

A first sliding ring 707 encircles hollow grooved tube 709, and includes an anchor pin (not shown) that extends laterally through groove 714 of hollow grooved tube 709. The cable 112, continues through the hollow grooved tube 709 to be attached to the anchor pin of first sliding ring 707. A coil spring 708 serves to separate first sliding ring 707 from terminating ring 710. Disposed on hollow grooved tube 709 between first sliding ring 707 and the center pivot rod 711 is a second sliding ring 716.

Attached to the hollow grooved tube 709 on a side opposite the first bow spring 703 is a first flexible bow spring 705. One end of the first flexible bow spring 705 is fixed to the hollow grooved tube 709 at a point 712 proximal to the center pivot rod 711, whereas the other end of the first flexible bow spring 405 is attached to second sliding ring 716. Similarly, attached to the hollow grooved tube 709 on a side opposite the second bow spring 704 is a second flexible bow spring 706. One end of the second flexible bow spring 706 is fixed to the hollow grooved tube 709 at a point 713 proximal to the center pivot rod 711, whereas the other end of the second flexible bow spring 706 is attached to second sliding ring 716. In the absence of pressure applied to the handles 710 and 702, there is a space 715 between second sliding ring 716 and first sliding ring 707.

When pressure is applied to the handles 701 and 702, first bow spring 703 comes into contact with first flexible bow spring 704, while second bow spring 704 comes into contact with second flexible bow spring 706. The pressure applied by bow springs 703 and 704, respectively, to flexible bow springs 705 and 706 causes the flexible springs 705 and 706 to be depressed, causing the second sliding ring 716 to move so as to close space 715 and engage first sliding ring 707, causing it to slide in groove 714 towards terminating ring 710, compressing spring 708. This releases tension on the cable 112, allowing it to loosen and to make the arm flexible. Release of pressure reverses the process and causes the cable to tighten to make the arm rigid.

Again, the degree of compression required to loosen the arm and the magnitude of the spaces 717 and 718 can be adjusted by a simple screw mechanism similar to the adjustment used on the handbrakes of a bicycle.

Figure 14A:
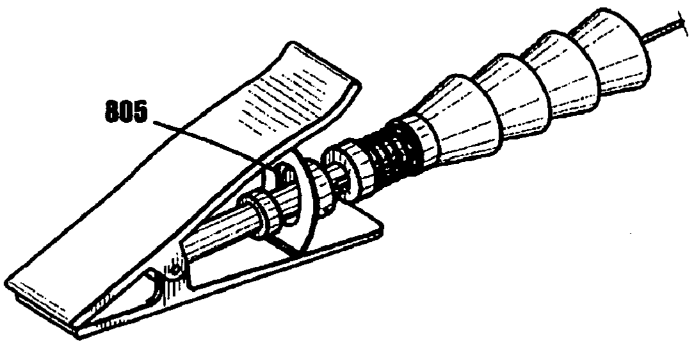
FIG. 14*a* is a perspective view of a bow spring clamp embodiment of the present invention.
Figure 14B:
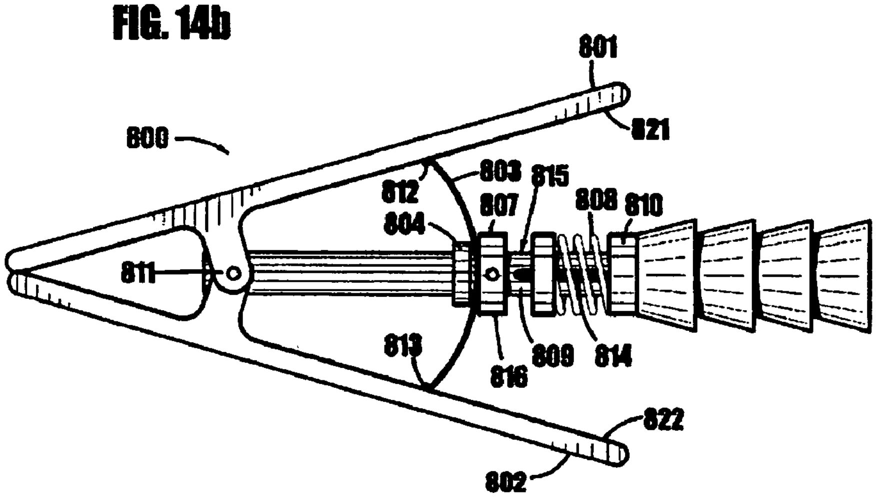
FIG. 14*b* is a side view of the bow spring clamp embodiment of FIG. 14*a;*

Another variation of the bow spring embodiment of the clamp is depicted in FIG. 14. Referring to the side view of FIG. 14*b*, the clamp 800 of this embodiment includes a first handle 801 and a second handle 802 connected by a center pivot rod 811. A biasing element, not shown for clarity, encircles the center pivot rod 811 and serves to maintain the clamp in a closed position as shown until pressure is applied to the handles 801 and 802. The first handle 801 has an underside 821 that faces an underside 822 of second handle 802.

Connecting the underside 821 of first handle 801 to the underside 822 of second handle 802 is a bow spring 803, fixed at a first end to first anchor point 812 on first handle 801, and fixed at a second end to second anchor point 813 on second handle 802. Attached to the center pivot rod 811 of the clamp is one end of a hollow grooved tube 809. On the other end of the hollow grooved tube 809 opposite of the center pivot rod 811 is a flange or terminating ring 810 that serves as a terminus for the tubular cone-shaped segments 111. Bow spring 803 has an opening 805, depicted in perspective view FIG. 14*a*, that enables hollow grooved tube to extend through the bow spring 803. A flange 804 on hollow grooved tube 809 serves to limit the backwards flex of bow spring 803 when the clamp 800 is in an open position.

A first sliding ring 807 encircles hollow grooved tube 809, and includes an anchor pin (not shown) that extends laterally through a groove 814 of hollow grooved tube 809. The cable 112 continues through the hollow grooved tube 809 to be attached to the anchor pin of first sliding ring 807. A coil spring 808 serves to separate first sliding ring 807 from terminating ring 810. Disposed on hollow grooved tube 809 between first sliding ring 807 and the bow spring 803 is a second sliding ring 816. In the absence of pressure applied to the handles 810 and 802, there is a space 815 between second sliding ring 816 and first sliding ring 807.

Figure 14C:
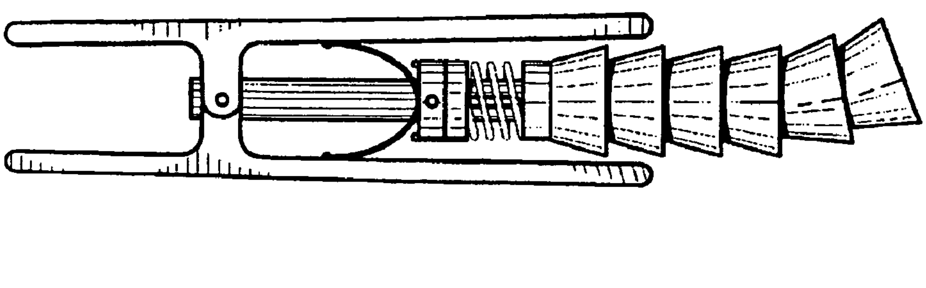
FIG. 14*c* is a side view of the bow spring clamp embodiment of FIG. 14*a;*

When pressure is applied to the handles 801 and 802, bow spring 803 flexes and comes into contact with the second sliding ring 816, causing it to move so as to close space 815 and engage first sliding ring 807, causing it to slide in groove 814 towards terminating ring 810, compressing spring 808. This releases tension on the cable 112, allowing it to loosen and to make the arm flexible (as depicted in FIG. 14*c*). Release of pressure reverses the process and causes the cable to tighten to make the arm rigid.

Figure 15:
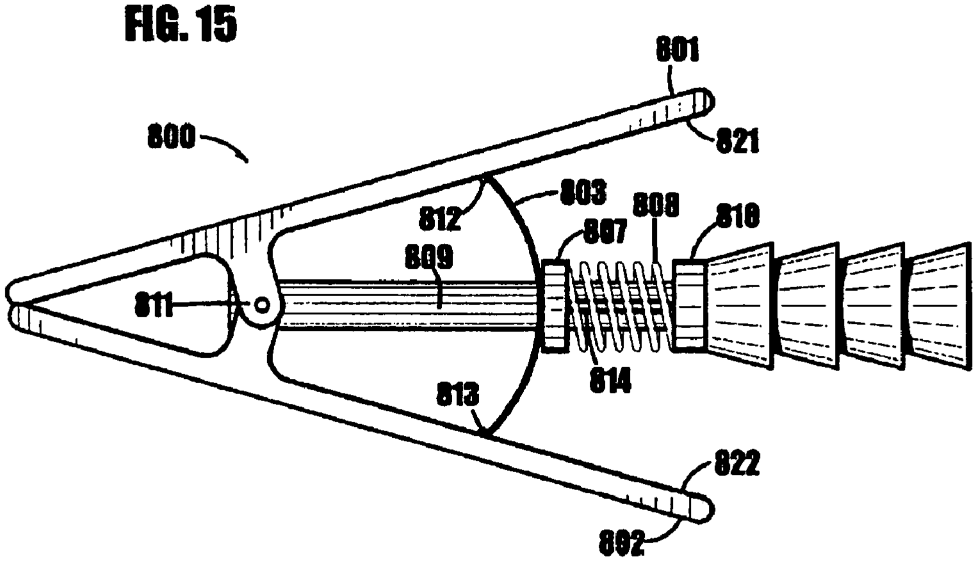
FIG. 15 is a side view of an embodiment of a bow spring clamp of the invention.
Figure 16A:
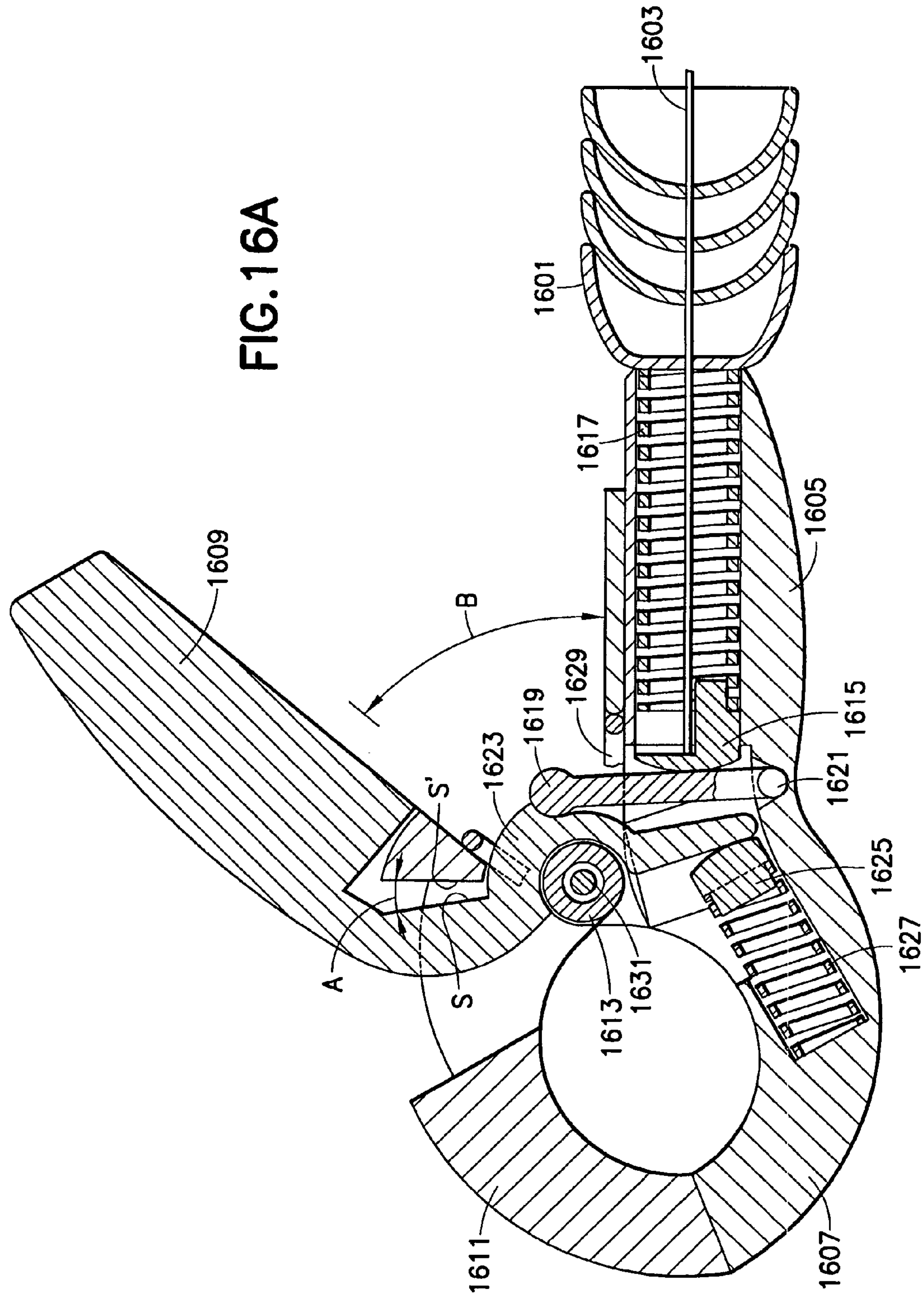
FIG. 16A is a side view (in cross-section) of another embodiment of the present invention.
Figure 16B:
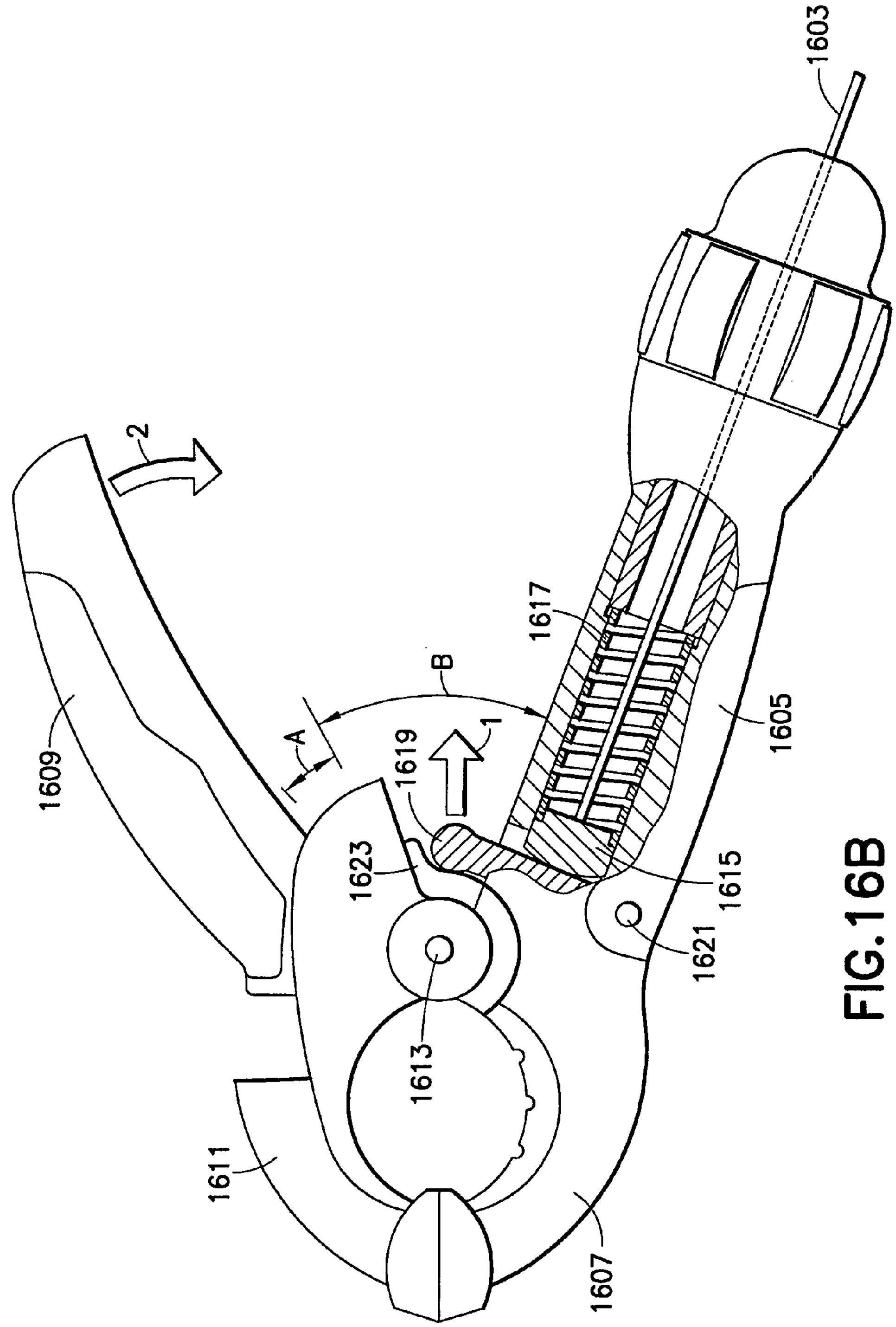
FIG. 16B is a side view (in partial cross-section) of the embodiment of FIG. 16A.
Figure 16C:
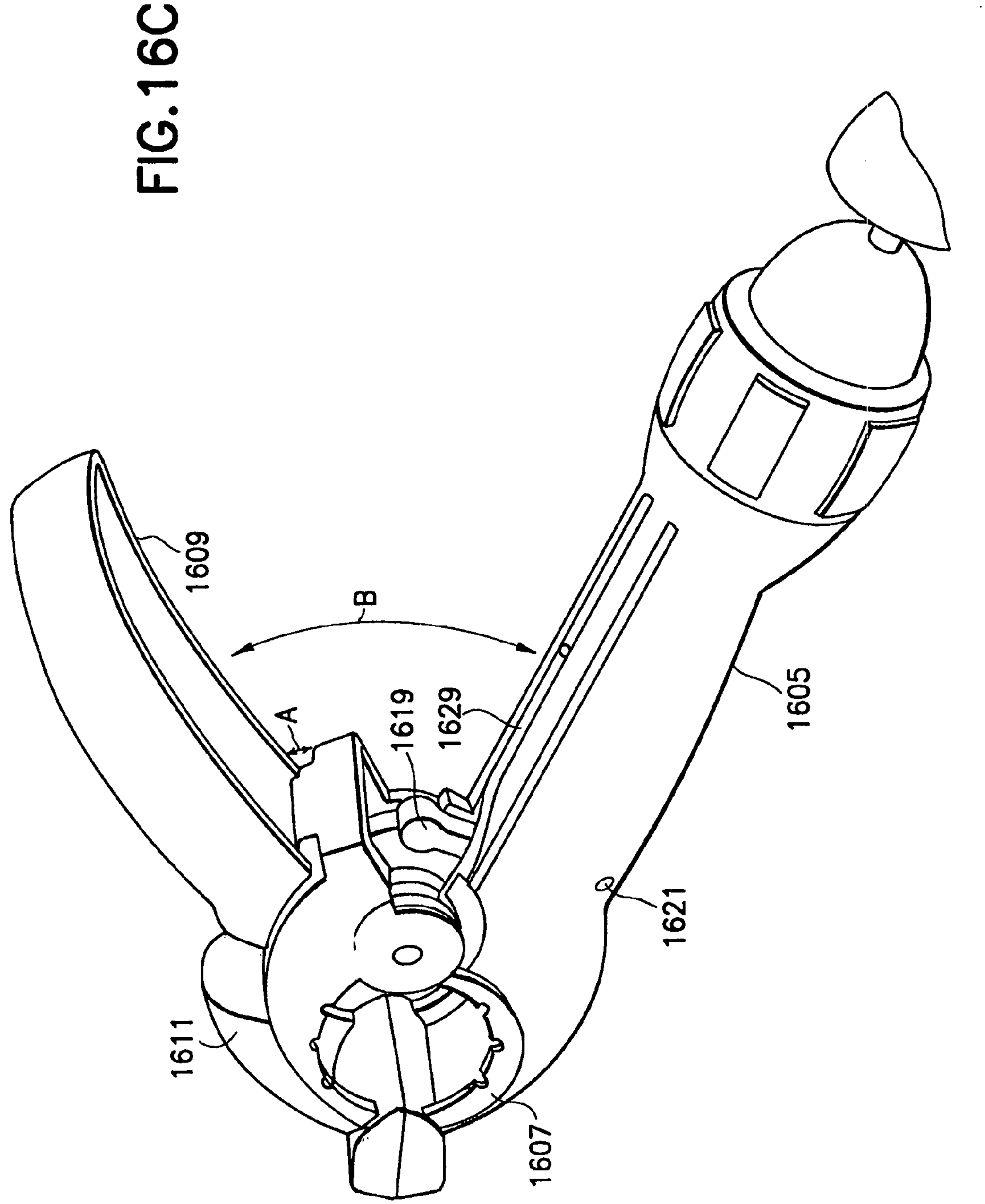
FIG. 16C is a perspective view of the embodiment of FIG. 16A.
Figure 16D:
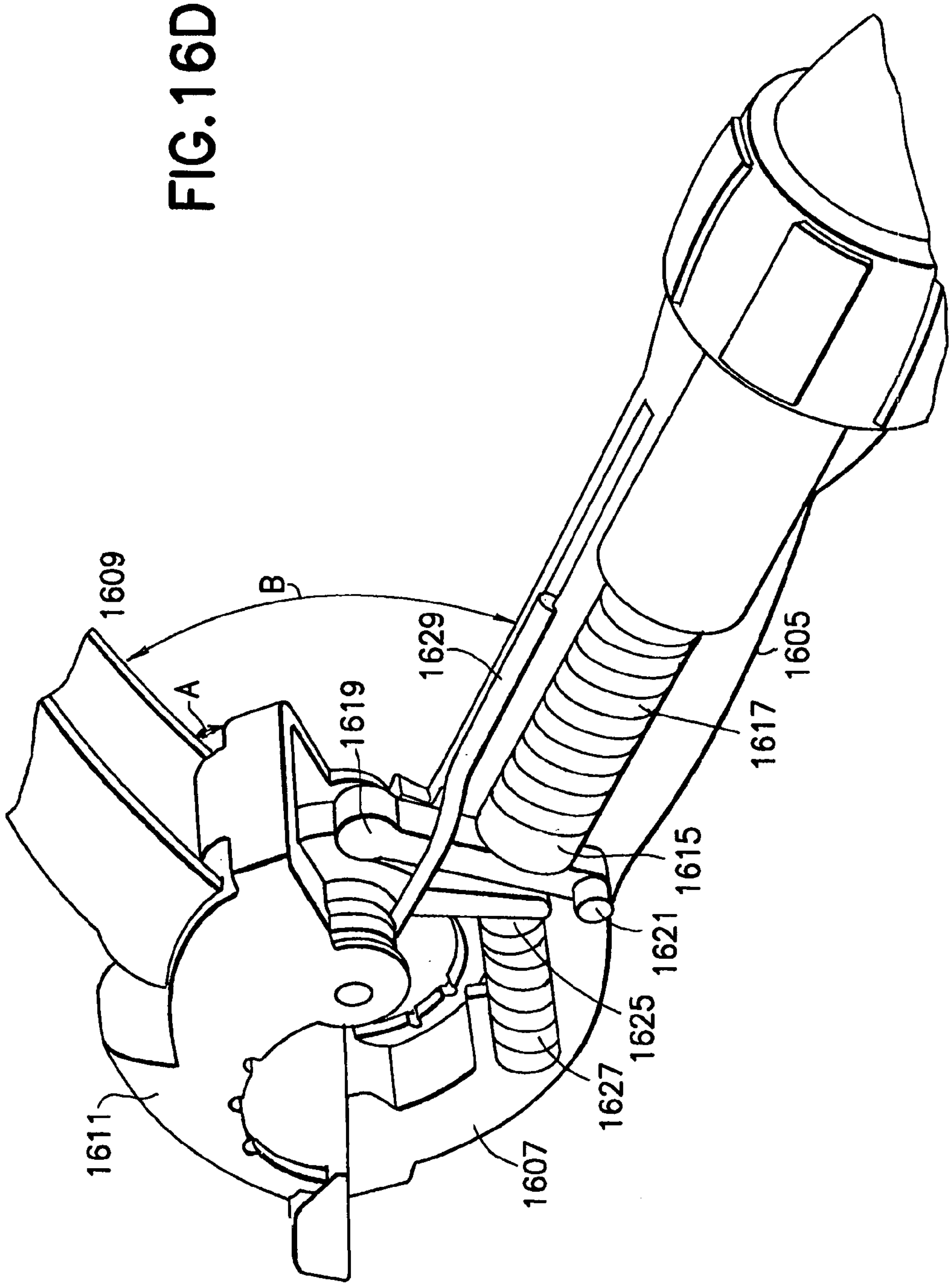
FIG. 16D is a perspective view (in partial cross-section) of the embodiment of FIG. 16A.
Figure 16E:
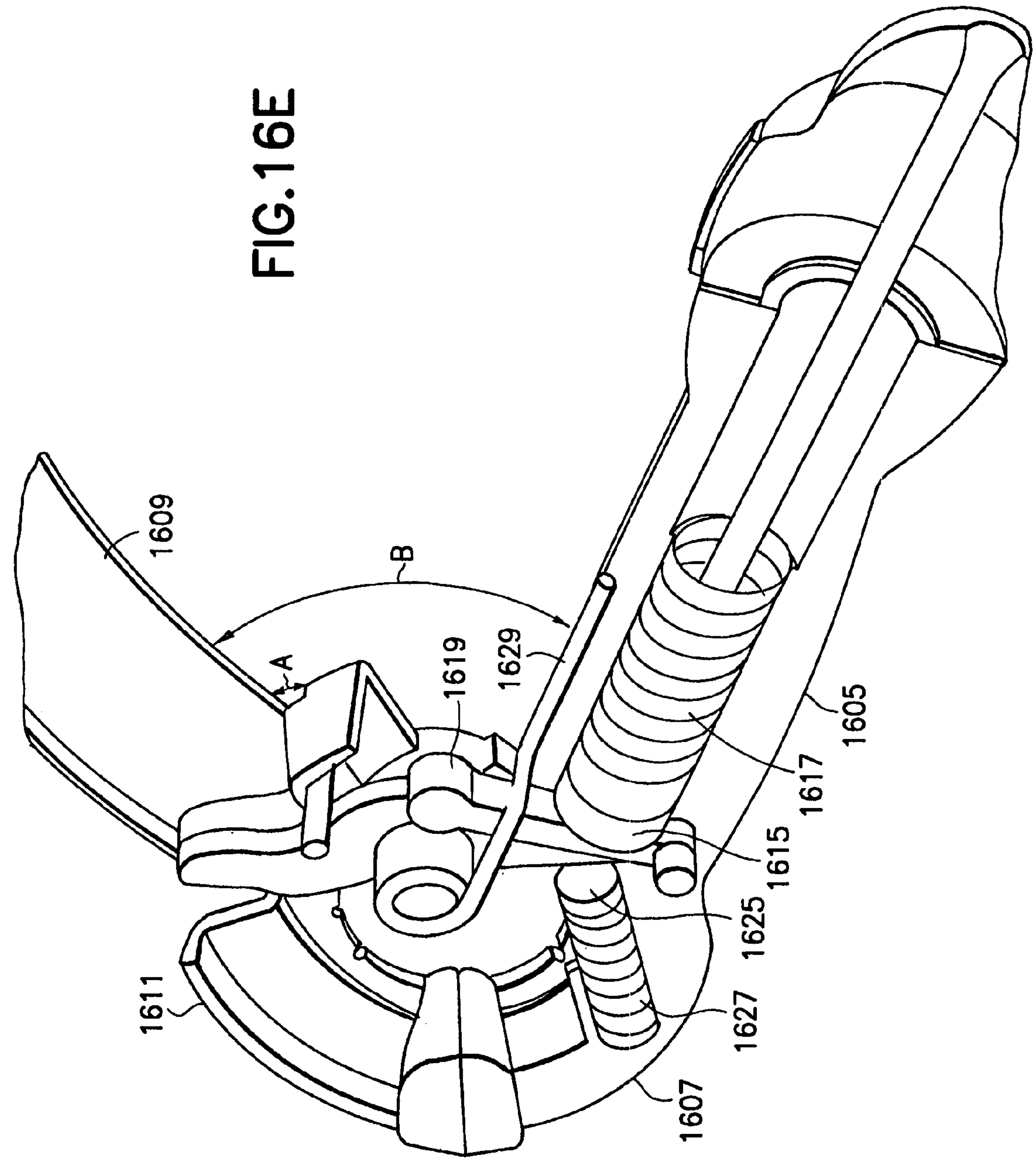
FIG. 16E is a perspective view (in cross-section) of the embodiment of FIG. 16A.
Figure 16F:
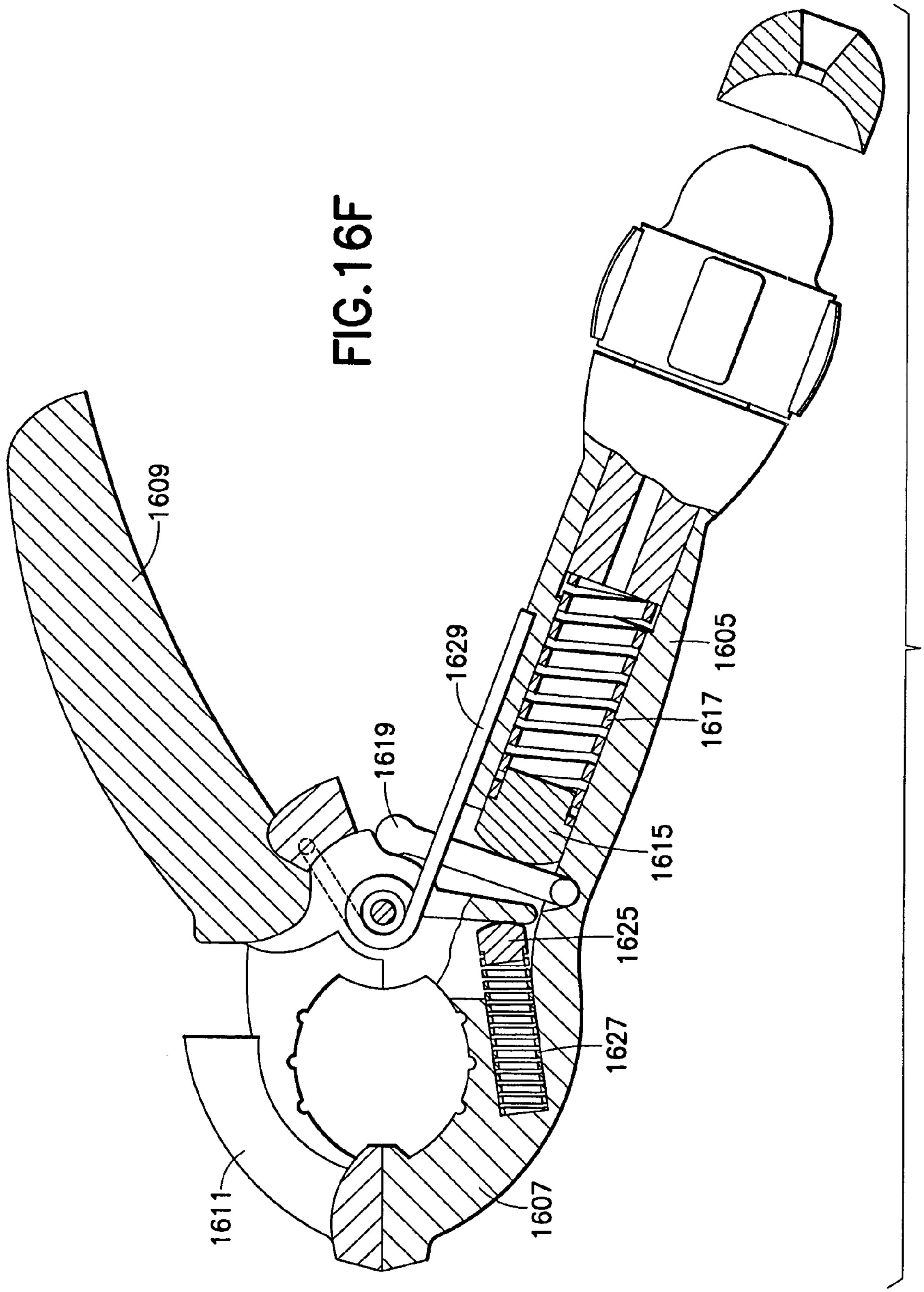
FIG. 16F is a side view (in cross-section) of the embodiment of FIG. 16A.
Figure 16G:
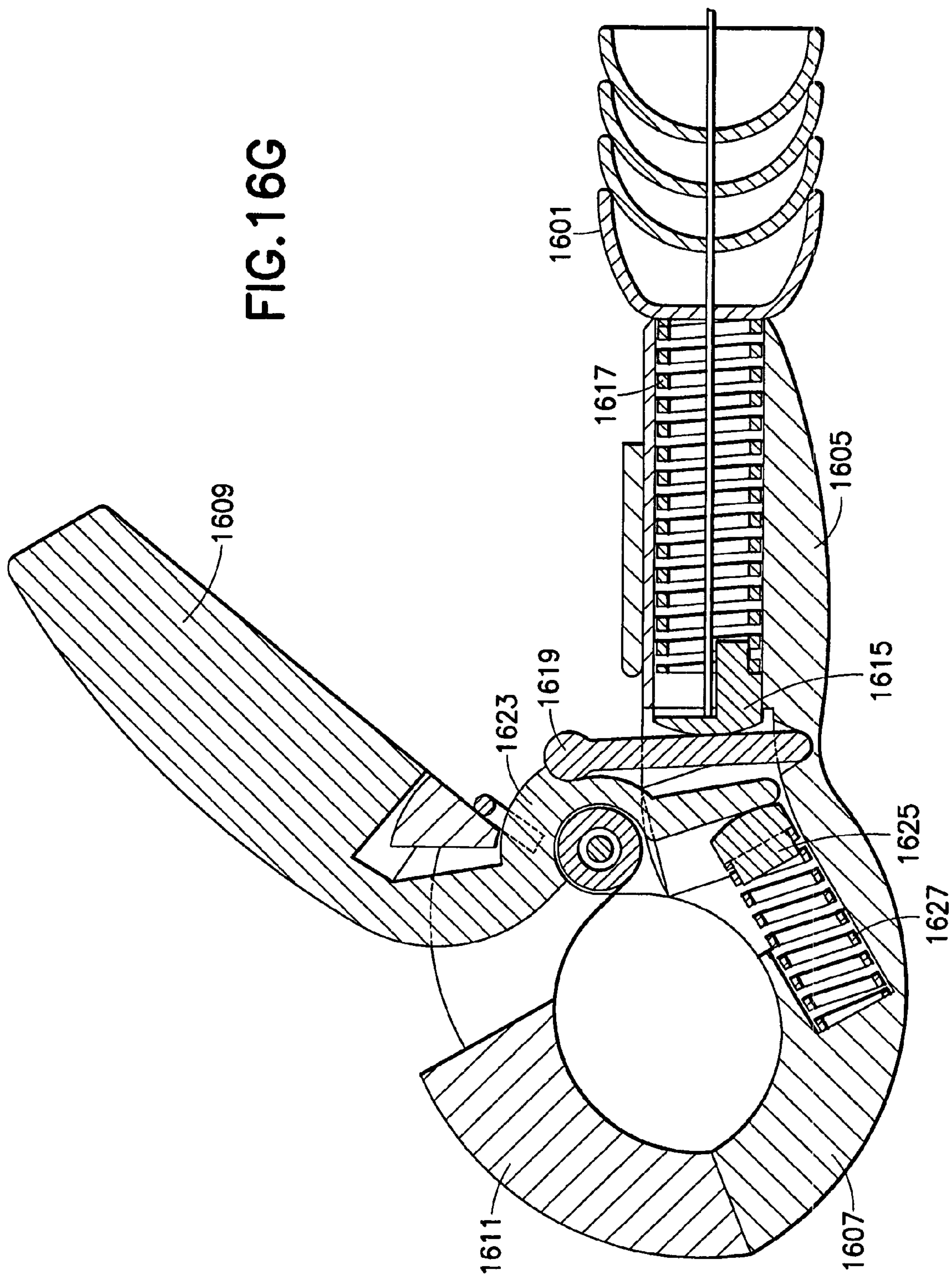
FIG. 16G is a side view (in cross-section) of the embodiment of FIG. 16A.

As with the case of the coil spring embodiments, there is an embodiment of this bow spring embodiment, depicted in FIG. 15, that utilizes only one sliding ring 807 and thus lacks the space between the first and second sliding rings. In this embodiment, application of pressure to handles 801 and 802 causes bow spring 803 to move sliding ring 807 towards fixed anchor ring 810, compressing coil spring 808, relieving tension on cable 112 thus rendering the arm flexible. However, in this embodiment, since the motion of sliding ring 807 is limited by groove 814 in hollow grooved tube 809, a space can be provided by the backward flex of bow spring 803. Thus, application of pressure to the handles 801 and 802 need not immediately cause the arm to loose rigidity.

FIGS. 6*a* and 6*b* depict another embodiment of the invention. This embodiment utilizes a ratchet type clamp instead of a spring clamp. This type of clamp uses a scissors mechanism to close and a ratchet mechanism to tighten and hold the clamp in a closed position.

The clamp 600 of this embodiment includes a first handle 601 and a second handle 602 connected by a center pivot rod 608. At the end of second handle 602 is a raised knob 603 attached to a terminating ring 604 that serves as a terminus for the tubular cone-shaped segments 111. Extending upwards from the second handle 602 is a ratchet 605, which extends upwards through an opening in the first handle 601. On the underside of first handle 601 adjacent to the ratchet 605 is a cable roller 606. The cable 112 extends through an opening in terminating ring 604 and a trough in raised knob 603 to run around cable roller 606, terminating at the top end of ratchet 605, where the cable 112 is attached.

Whenever the handles 601 and 602 of the clamp 600 are squeezed together to clamp an object, the cable 112 is tightened so as to make the arm rigid. Whenever the ratchet mechanism is released it simultaneously releases the tension on the cable and renders the arm flexible, as shown in FIG. 6*b*. Whenever the clamp is closed the cable is pulled taut and the arm is made rigid.

Referring now to FIGS. 16A–16G, another embodiment of the present invention is shown. As seen in these FIGS., an apparatus for clamping an object is provided. More particularly, the apparatus includes Arm 1601 (only a portion of which is shown) and Cable 1603 (only a portion of which is shown). Cable 1603 is disposed within Arm 1601 (as discussed in more detail below, Arm 1601 may be made substantially inflexible when tension is applied to Cable 1603 and Arm 1601 may be made flexible when the tension in Cable 1603 is reduced or eliminated). Of note, Arm 1601 may be, for example (which example is intended to be illustrative and not restrictive), of the tubular cone-shaped segments type described above.

In any case, First Handle 1605 is attached to Arm 1601 (wherein First Handle 1605 receives Cable 1603) and First Handle 1605 includes First Gripping Element 1607. In addition, the apparatus includes Second Handle 1609 and Second Gripping Element 1611.

Moreover, Pivot Mechanism 1613 is provided for mounting First Handle 1605, Second Handle 1609 and Second Gripping Element 1611 in a pivoting relationship relative to one another. In this regard, Second Handle 1609 is configured to pivot relative to First handle 1605 independently of Second Gripping Element 1611 for a first portion of a pivot distance that Second Handle 1609 can move relative to First handle 1605 (see arc "A") and Second Handle 1609 is configured to cause Second Gripping Element 1611 to pivot relative to First Handle 1605 along with Second Handle 1609 for a second portion of the pivot distance that Second Handle 1609 can move relative to the First Handle 1605 (see arc "B").

Further, Cable 1603 is attached to Cable End Cap 1615 and First Spring 1617 is provided for biasing Cable End Cap 1615 forward (wherein such forward biasing of Cable End Cap 1615 keeps Cable 1603 in tension).

Of note, in this embodiment, movement of Second Handle 1609 towards First Handle 1605 within the first portion of the pivot distance that Second Handle 1609 can move relative to First Handle 1605 (i.e., within arc "A") actuates an actuating mechanism (discussed in more detail below) to reduce the bias of First Spring 1617 and to reduce the tension in Cable 1603 without substantially changing the position of Second Gripping Element 1611 (thus, an object (not shown) which is being held between First Gripping Element 1607 and Second Gripping Element 1611 may be retained while Second Handle 1609 moves relative to First Handle 1605 within arc "A" even while Arm 1601 is rendered flexible for repositioning and the like).

Of further note, movement of Second Handle 1609 towards First Handle 1605 for the second portion of the pivot distance that Second Handle 1609 can move relative to First Handle 1605 (i.e., within arc "B") causes Second Gripping Element 1611 to pivot open relative to First Gripping Element 1607 (thus, an object (not shown) which is being held between First Gripping Element 1607 and Second Gripping Element 1611 may be released while Second Handle 1609 moves relative to First Handle 1605 within arc "B"). More particularly, Second Gripping Element 1611 is caused to pivot open relative to First Gripping Element 1607 via contact at surfaces S and S'.

Of still further note, the arcs shown as "A" and "B" are provided for example only (which example is intended to be illustrative and not restrictive) and the absolute and/or relative sizes of such arcs "A" and "B" may depend upon the size and/or shape of an object being gripped between First Gripping Element 1607 and Second Gripping Element 1611. In one specific example (which example is intended to be illustrative and not restrictive), arc "A" may be sized such that Second Gripping Element 1611 does not begin to pivot until Second Handle 1609 moves below about 32 degrees (relative to First Handle 1605).

In addition, it is noted that the actuating mechanism may include Lever Arm 1619 (pivoting at Pivot 1621) and Cam 1623. More particularly, Lever Arm 1619 may be disposed between Cam 1623 (operatively connected, for example, to Second Handle 1609) and Cable End Cap 1615. Lever Arm 1619 may be used for applying force to Cable End Cap 1615 and First Spring 1617 (see the general direction of arrow "1" of FIG. 16B) in response to movement of Second Handle 1609 and Cam 1623 (see the general direction of arrow "2" of FIG. 16B). The force thus applied by Lever Arm 1619 to Cable End Cap 1615 and First Spring 1617 operates to reduce the bias of First Spring 1617 and to reduce the tension in the Cable 1603.

Moreover, Second Handle 1609 may be biased closed by Spring End Cap 1625 (biased by Second Spring 1627) and Second Gripping Element 1611 may be biased closed by Third Spring 1629. In this regard, Pivot Mechanism 1613 may include Pivot Rod 1631 and Third Spring 1629 may be a coil spring which is coiled around Pivot Rod 1631.

Further, as seen in these FIGS. 16A–16G, First Handle 1605 and First Gripping Element 1607 are formed as an integrated unit (in another example, not shown, First Handle 1605 and First Gripping Element 1607 may be separate components which are operatively connected together).

Further still, it is noted that a second end of Cable 1603 (i.e., the end of Cable 1603 opposite the portion of Cable 1603 received by First Handle 1605) may be held in a substantially fixed relationship to Arm 1601. In one specific example (which example is intended to be illustrative and not restrictive), a second end of Cable 1603 may be held in a substantially fixed relationship to Arm 1601 at a second end of Arm 1601 (i.e. the end of Arm 1601 opposite the portion of Arm 1601 attached to First Handle 1605).

Further still, it is noted that a mounting element may be disposed at the second end of Arm 1601 (i.e. the end of Arm 1601 opposite the portion of Arm 1601 attached to First Handle 1605). In one specific example (which example is intended to be illustrative and not restrictive), the mounting element may be selected from the group including, but not limited to: (a) a temporary mounting element; and (b) a permanent mounting element. In another specific example (which example is intended to be illustrative and not restrictive), the mounting element may be selected from the group including, but not limited to: (a) a clamp (see, e.g. FIGS. 20A and 20B); (b) a threaded fastener; (c) a suction cup; and/or (d) a weighted base.

Figure 17A:
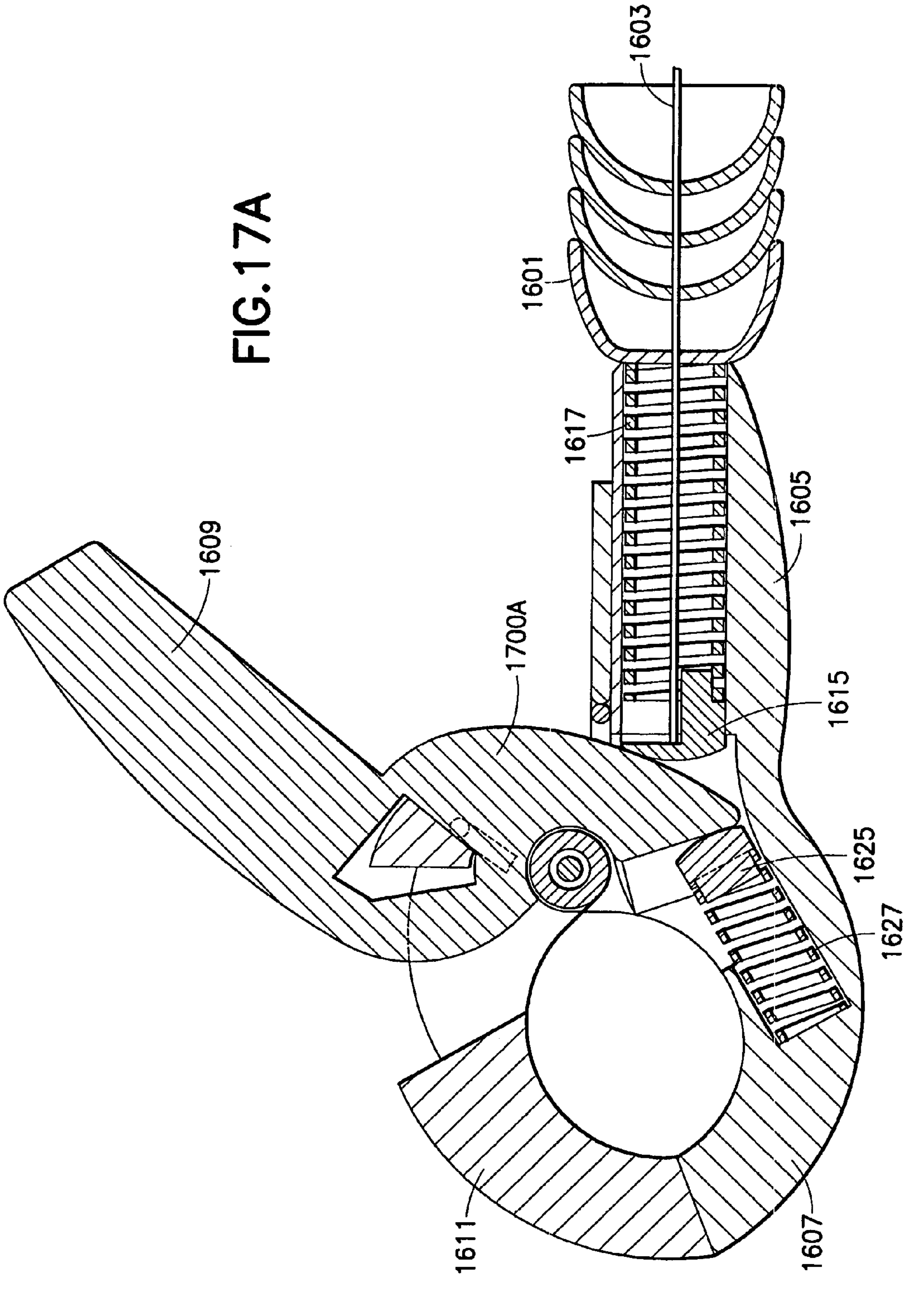
FIGS. 17A and 17B are side views (in cross-section) of other embodiments of the present invention.
Figure 17B:
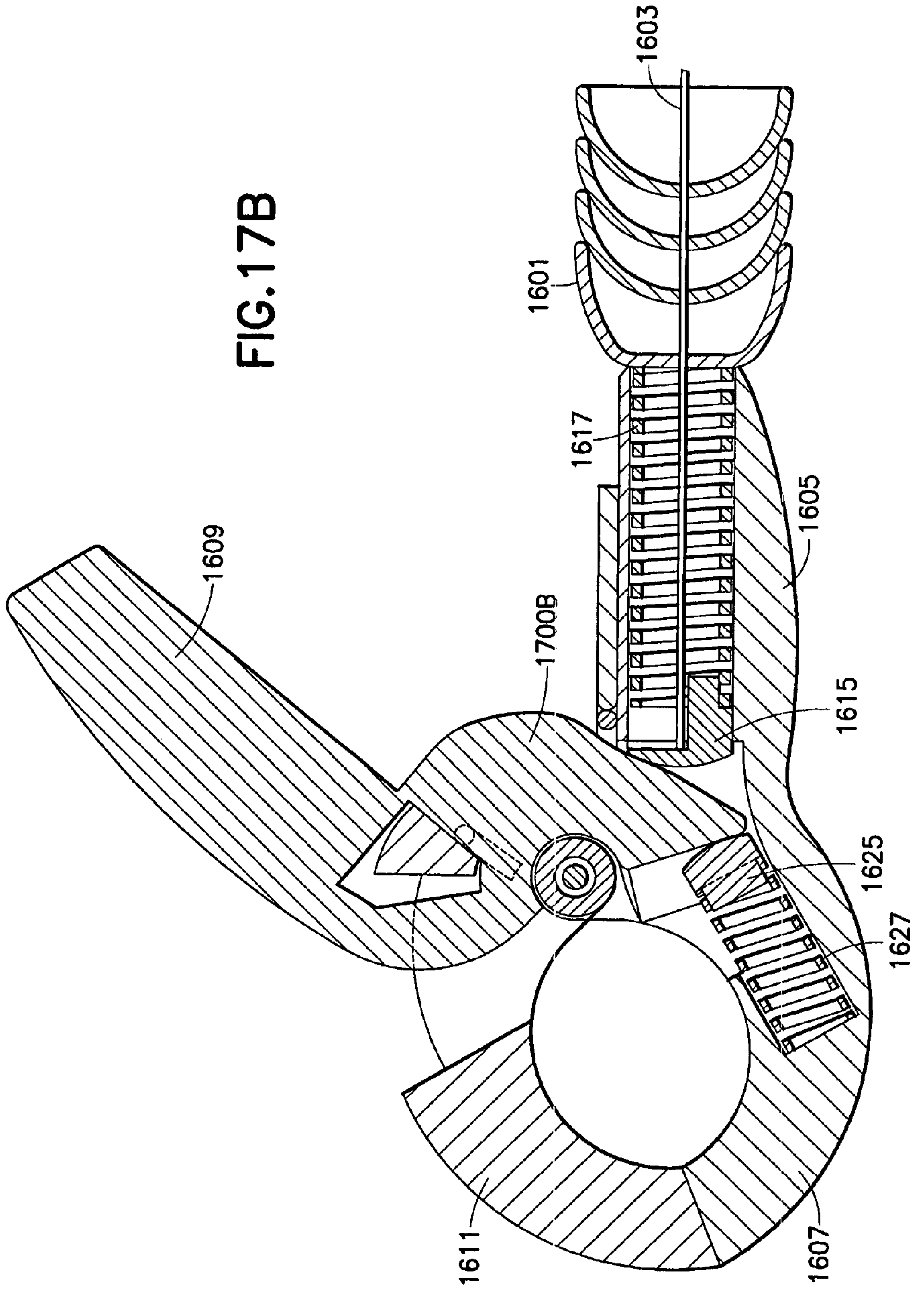

Two other embodiments of the present invention are shown in FIGS. 17A and 17B (in these FIGS. 17A and 17B, the same elements of FIGS. 16A–16G will be shown with the same reference numerals). In any case, as seen in these FIGS. 17A and 17B, the actuating mechanism may comprise Cam 1700A (FIG. 17A) or 1700B (FIG. 17B) operatively connected to Second Handle 1609 for applying force directly against Cable End Cap 1615 (i.e., without an intervening lever arm) to reduce the bias of First Spring 1617 and to reduce the tension in Cable 1603. Of note, the main difference between Cam 1700A (FIG. 17A) and 1700B (FIG. 17B) is in the specific shape of the cam profile (which shape is intended to be illustrative and not restrictive).

Figure 18:
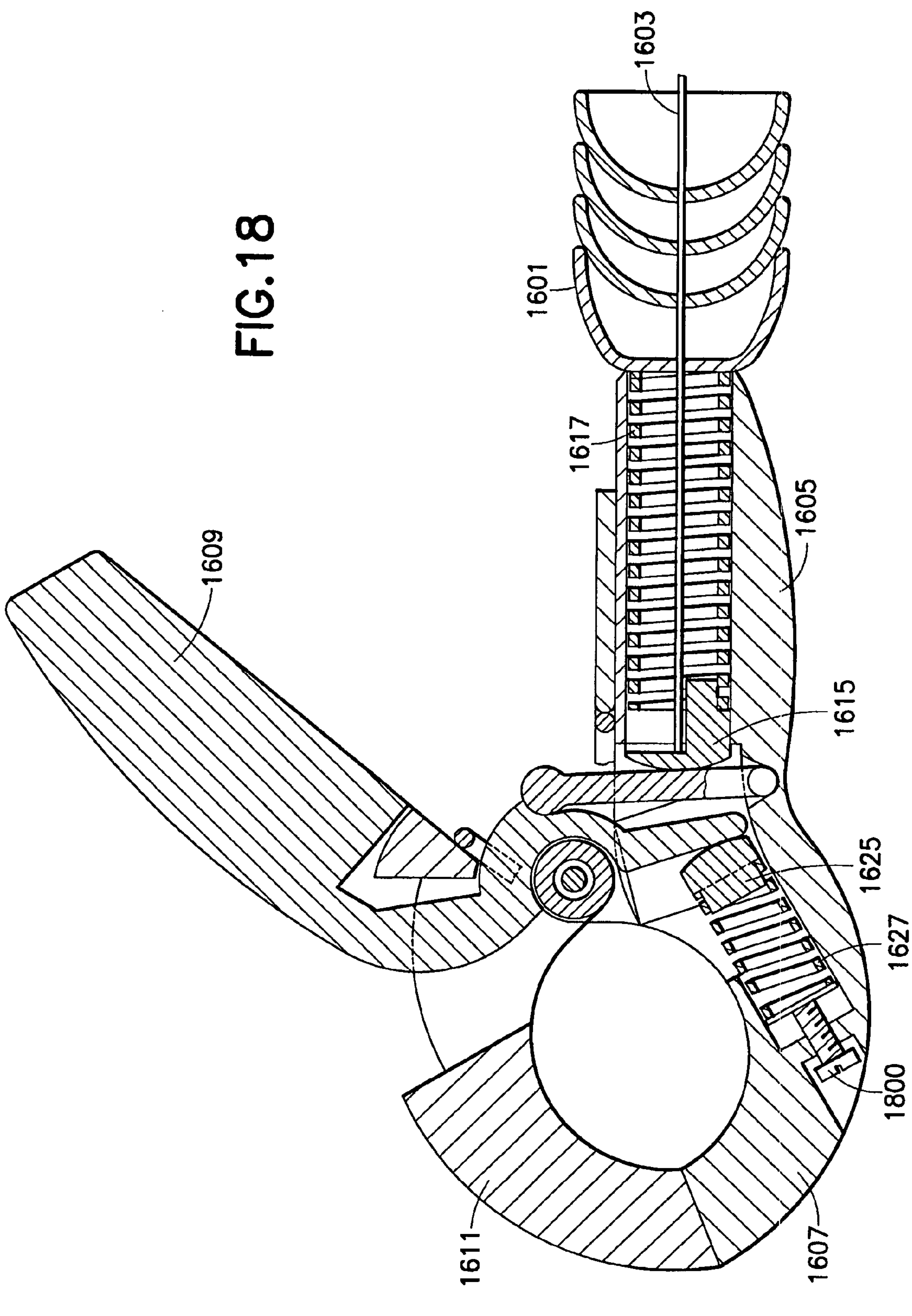
FIG. 18 is a side view (in cross-section) of another embodiment of the present invention.

Referring now to FIG. 18, another embodiment of the present invention is shown (in this FIG. 18, the same elements of FIGS. 16A–16G will be shown with the same reference numerals). In any case, as seen in this FIG. 18, Adjustment Screw 1800 may be provided for adjusting (e.g., tightening or loosening) Second Spring 1627.

Figure 19:
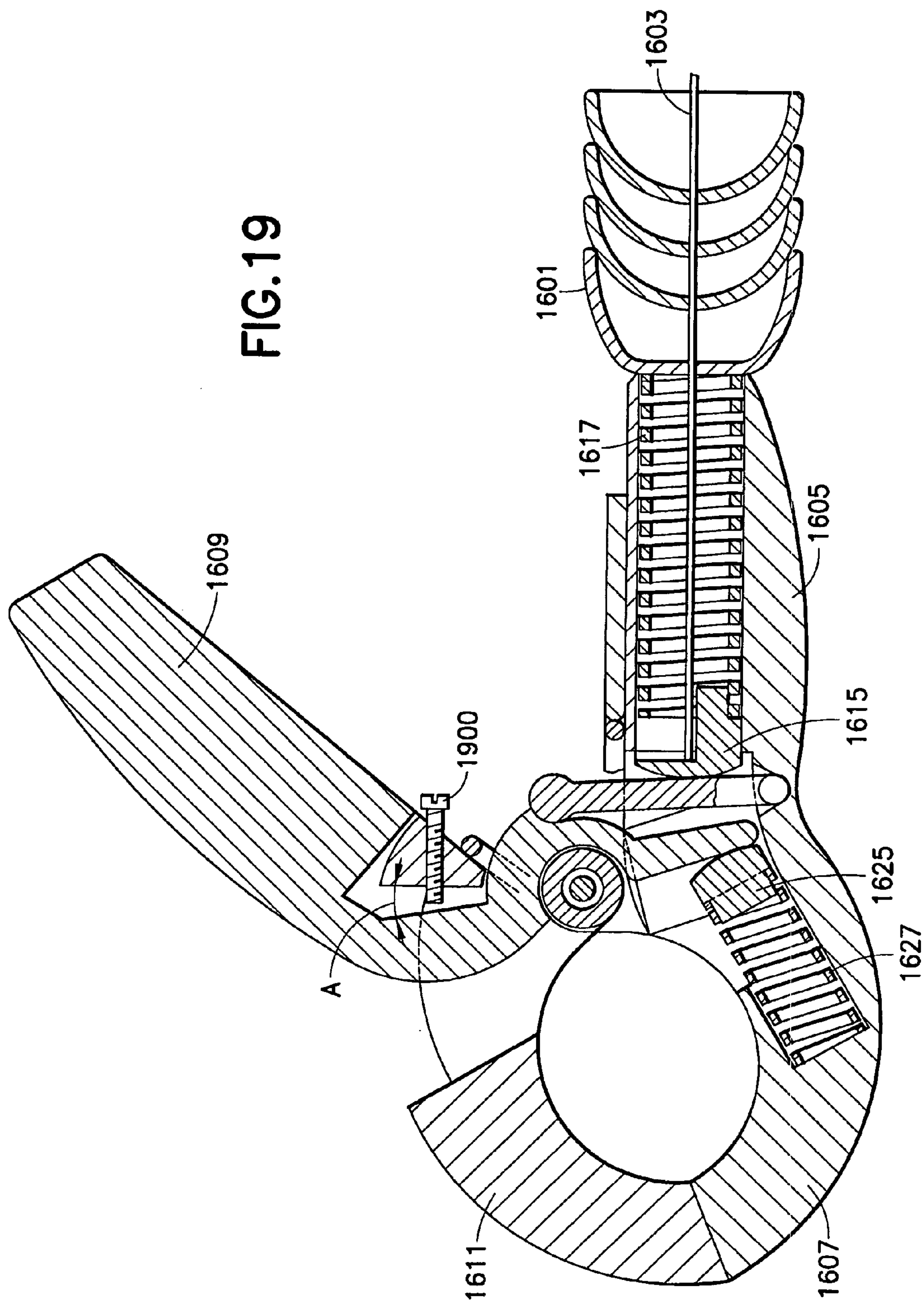
FIG. 19 is a side view (in cross-section) of another embodiment of the present invention.

Referring now to FIG. 19, another embodiment of the present invention is shown (in this FIG. 19, the same elements of FIGS. 16A–16G will be shown with the same reference numerals). In any case, as seen in this FIG. 19, Adjustment Screw 1900 may be provided for adjusting (e.g., making larger or smaller) the first portion of the pivot distance that Second Handle 1609 can move relative to First Handle 1605 (i.e., arc "A").

Figure 20A:
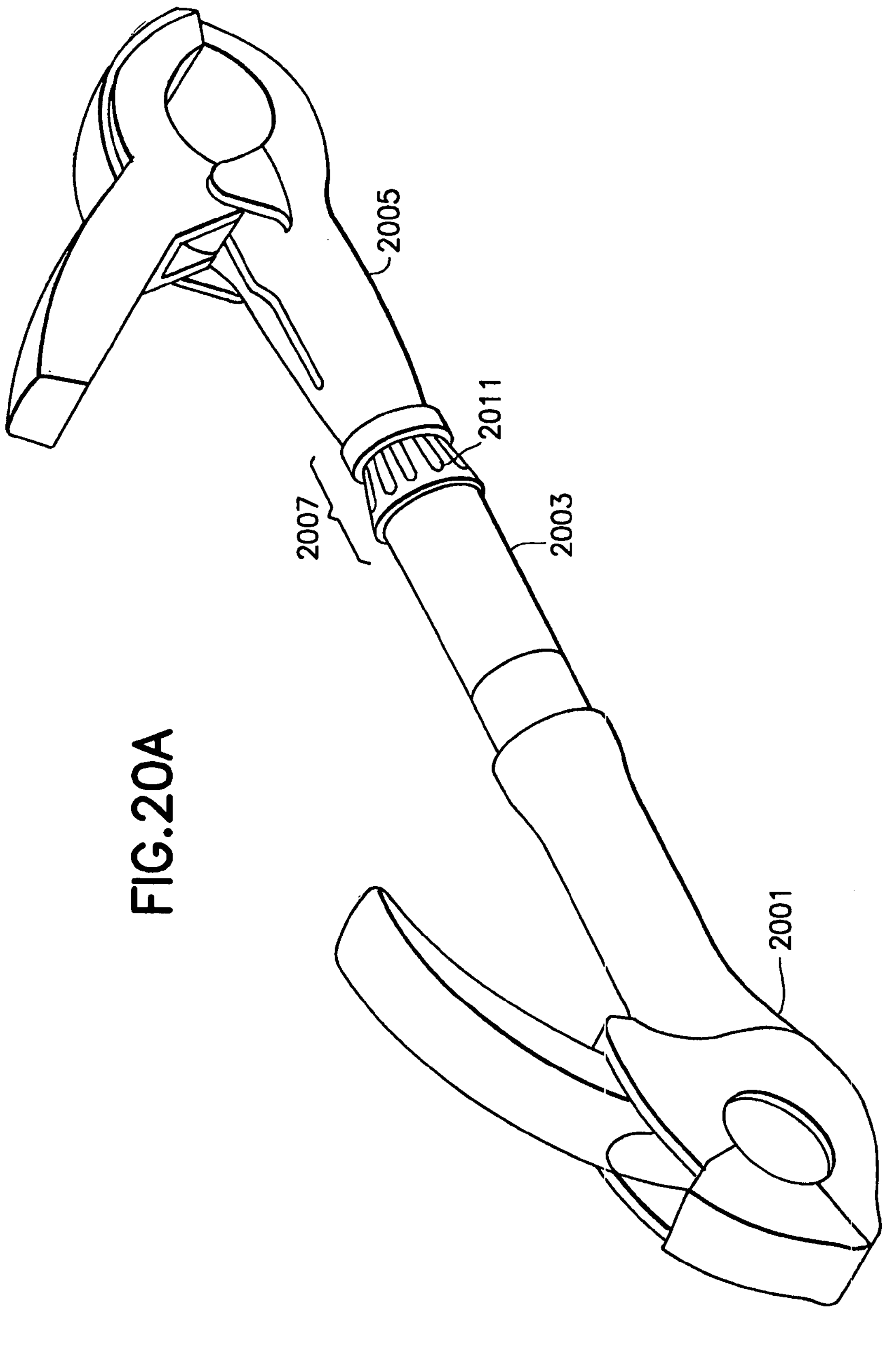
FIG. 20A is a perspective view of another embodiment of the present invention.
Figure 20B:
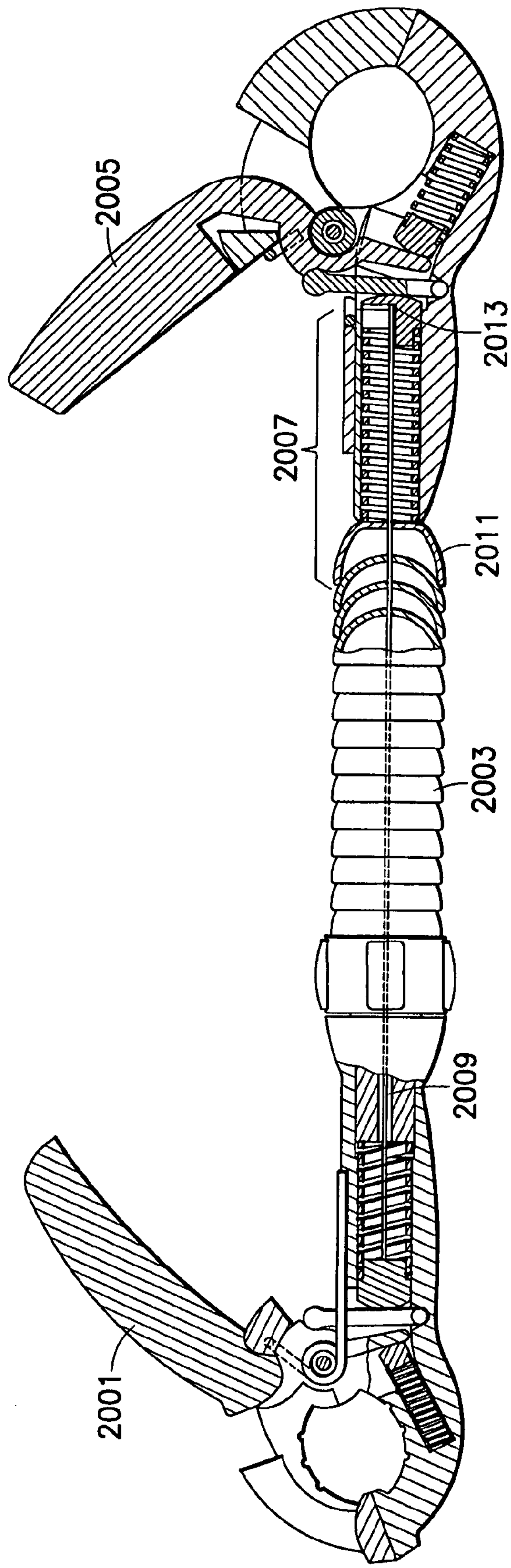
FIG. 20B is a side view (in cross-section) of the embodiment of FIG. 20A.

Referring now to FIGS. 20A and 20B, another embodiment of the present invention is shown. As seen in these FIGS. 20A and 20B, Clamp 2001 (of the type shown in FIGS. 16A–16G, for example) is connected (via Arm 2003) to a conventional-type Clamp 2005 (in another example, not shown, a clamp of the type shown in FIGS. 16A–16G may be disposed at each end of Arm 2003). Further, Adjustment Mechanism 2007 (shown in detail in FIG. 20B) may be provided for adjusting (e.g., tightening or loosening) tension in Cable 2009. More particularly, as seen in FIG. 20B, when Rotatable Knob 2011 is rotated one way, Rotatable Knob 2011 will move towards Clamp 2005 (Rotatable Knob 2011 may include external threads (not shown) for engagement with complementary internal threads (not shown) of Clamp 2005). Since Cable 2009 is fixed relative to Clamp 2005 at Fixed Point 2013 in this embodiment, this movement of Rotatable Knob 2011 towards Clamp 2005 will, in effect, shorten the length of Arm 2003 and reduce the tension in Cable 2009). In contrast, when Rotatable Knob 2011 is rotated the other way, Rotatable Knob 2011 will move away from Clamp 2005. Again, since Cable 2009 is fixed relative to Clamp 2005 at Fixed Point 2013 in this embodiment, this movement of Rotatable Knob 2011 away from Clamp 2005 will, in effect, increase the length of Arm 2003 and increase the tension in Cable 2009). Of note, Adjustment Mechanism 2007 may be used, for example, to adjust for stretching of Cable 2009 over time and/or to adjust the tension in Cable 2009 in real-time (e.g., as Clamp 2001 is being used).

Referring now to FIGS. 21A–21D, other embodiments of the present invention are shown. More particularly, as seen in FIG. 21A, the present invention may utilize one or more interchangeable clamps (shown here as Clamp 2101, 2103 and 2105). Further (as seen in FIGS. 21A–21D), the present invention may utilize a mechanism, such as Compression Mechanism 2107, for adjusting tension in the cable independently of the clamps. Further still, (as seen in FIG. 21D), the present invention may utilize Mounting Base 2109. In one specific example (which example is intended to be illustrative and not restrictive), Mounting Base 2109 may be rotating. In another specific example (which example is intended to be illustrative and not restrictive), Mounting Base 2109 may have a magnetic bottom (e.g., for attaching to a metallic surface).

Figure 22:
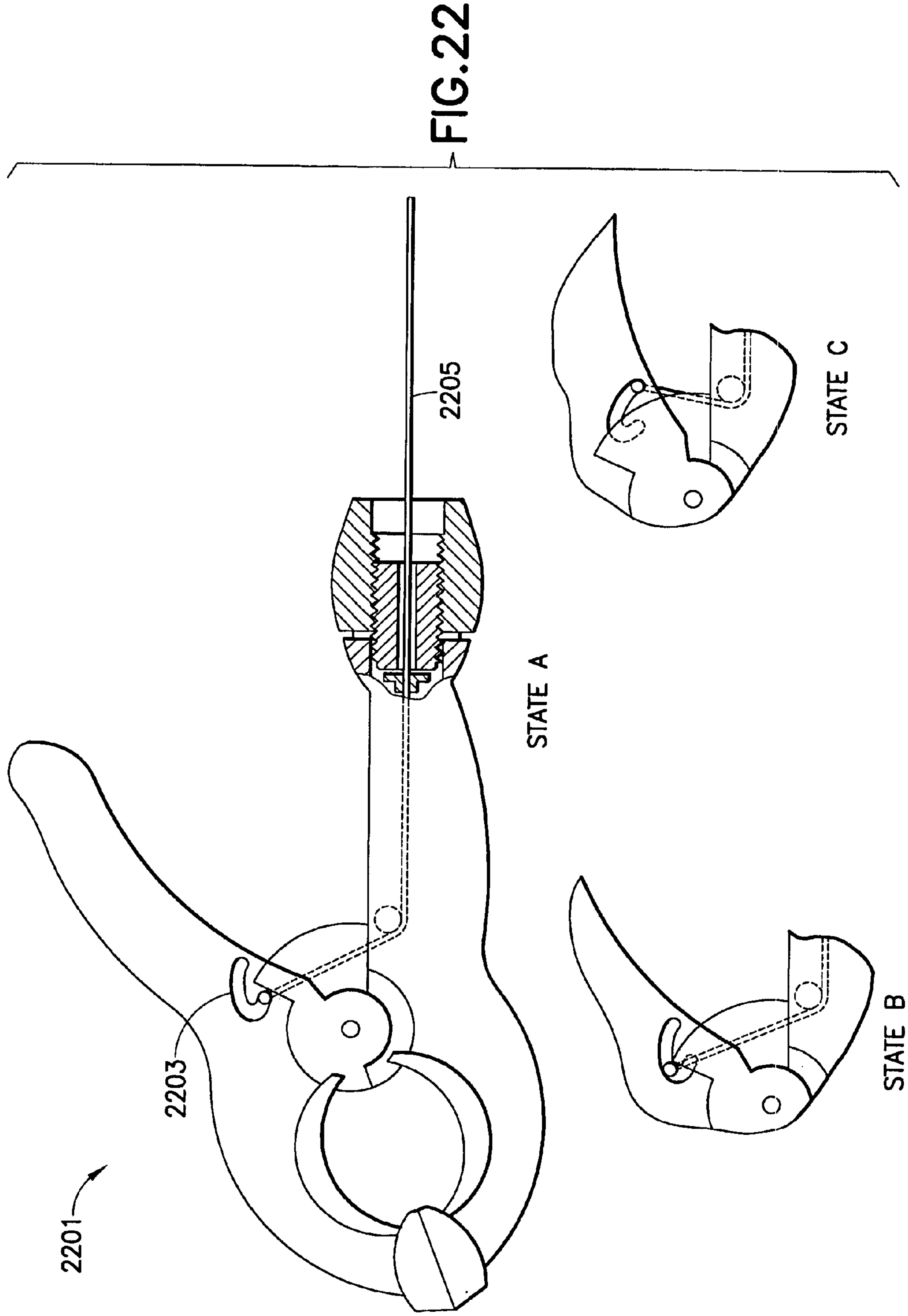
FIG. 22 shows another embodiment of the present invention.

Referring now to FIG. 22, another embodiment of the present invention is shown. More particularly, as seen in this FIG., Clamp 2201 may utilize Guide Groove 2203 for reducing tension in Cable 2205. More particularly, when Clamp 2201 is fully closed (as depicted at "State A") Cable 2205 may be under essentially full tension (as seen by the position of Cable 2205 in Guide Groove 2203). Likewise, when Clamp 2201 is open, but not fully open (as depicted at "State B") Cable 2205 may still be under essentially full tension (as seen by the position of Cable 2205 in Guide Groove 2203). Of note, this "State B" permits an object (not shown) to be released even while arm is rendered essentially inflexible. Finally, when Clamp 2201 is fully open (as depicted at "State C") Cable 2205 may be given slack (as seen by the position of Cable 2205 in Guide Groove 2203). Of note, in this "State C" the arm is rendered flexible.

While a number of embodiments of the present invention have been described, it is understood that these embodiments are illustrative only, and not restrictive, and that many modifications may become apparent to those of ordinary skill in the art. For example, the cam and/or the lever arm may utilize any desired profile (e.g., to achieve a desired amount of leverage and/or actuation speed). Further, arcs A and B may be of any desired size (e.g., arc A may produce a gap of about 1 cm). Further still, adjustment mechanisms (e.g. adjustment screws) may be provided for adjusting (e.g., tightening or loosening) any of the springs and/or for adjusting (e.g., making smaller or larger) any of the pivot distances. Further still, while an arm made of a plurality of tubular, cone shaped segments has been described, the present invention may be utilized with any desired type of arm which is capable of being rendered flexible and inflexible. Further still, instead of (or in addition to) a central anchoring point, one or more anchoring points at any place(s) along an arm may be utilized.

What is claimed is:

1. An apparatus for clamping an object, comprising:
- an arm;
- a cable disposed within the arm;
- a first handle attached to a first end of the arm, wherein the first handle receives a first end of the cable and the first handle includes a first gripping element;
- a second handle;
- a second gripping element;
- a pivot mechanism for mounting the first handle, the second handle and the second gripping element in a pivoting relationship relative to one another, wherein the second handle is configured to pivot relative to the first handle independently of the second gripping element for a first portion of a pivot distance that the second handle can move relative to the first handle and the second handle is configured to cause the second gripping element to pivot relative to the first handle along with the second handle for a second portion of the pivot distance that the second handle can move relative to the first handle;

a first spring for biasing the cable received by the first handle in tension; and an actuating mechanism for applying force to the first spring to reduce the bias thereof and to reduce the tension in the cable;

wherein movement of the second handle towards the first handle within the first portion of the pivot distance that the second handle can move relative to the first handle actuates the actuating mechanism to reduce the bias of the first spring and to reduce the tension in the cable without substantially changing the position of the second gripping element.

2. The apparatus of claim 1, wherein the arm is substantially inflexible when the first spring biases the cable in tension and the arm is flexible when the tension in the cable is reduced.

3. The apparatus of claim 2, wherein movement of the second handle towards the first handle for the second portion of the pivot distance that the second handle can move relative to the first handle causes the second gripping element to pivot open relative to the first gripping element.

4. The apparatus of claim 3, wherein the first portion of the pivot distance that the second handle can move relative to the first handle is variable.

5. The apparatus of claim 4, wherein the first portion of the pivot distance that the second handle can move relative to the first handle is varied using a screw.

6. The apparatus of claim 2, wherein the actuating mechanism comprises a cam operatively connected to the second handle for applying force to the first spring to reduce the bias thereof and to reduce the tension in the cable.

7. The apparatus of claim 6, wherein the actuating mechanism further comprises a lever arm between the cam and the first spring for applying force to the first spring in response to movement of the cam to reduce the bias of the first spring and to reduce the tension in the cable.

8. The apparatus of claim 2, further comprising a second spring for biasing at least one of the second handle and the second gripping element closed.

9. The apparatus of claim 8, wherein the pivot mechanism includes a pivot rod and the second spring comprises a coil spring which is coiled around the pivot rod.

10. The apparatus of claim 2, wherein the first handle and the first gripping element are formed as an integrated unit.

11. The apparatus of claim 2, wherein the first handle and the first gripping element are separate components which are operatively connected together.

12. The apparatus of claim 2, wherein a second end of the cable is held in a substantially fixed relationship to the arm.

13. The apparatus of claim 12, wherein the second end of the cable is held in a substantially fixed relationship to the arm at a second end of the arm.

14. The apparatus of claim 2, wherein a mounting element is disposed at a second end of the arm.

15. The apparatus of claim 14, wherein the mounting element is selected from the group including: (a) a temporary mounting element; and (b) a permanent mounting element.

16. The apparatus of claim 15, wherein the mounting element is selected from the group including: (a) a clamp; (b) a threaded fastener; (c) a suction cup; and (d) a weighted base.

17. An apparatus for clamping an object, comprising:

an arm;

a cable disposed within the arm;

a first handle attached to a first end of the arm, wherein the first handle receives a first end of the cable at a first end of the first handle and the first handle includes a first gripping element at a second end of the first handle;

a second handle;

a second gripping element;

a pivot mechanism for mounting the first handle, the second handle and the second gripping element in a pivoting relationship relative to one another, wherein the second handle is configured to pivot relative to the first handle independently of the second gripping element for a first portion of the pivot distance that the second handle can move relative to the first handle and the second handle is configured to cause the second gripping element to pivot relative to the first handle along with the second handle for a second portion of the pivot distance that the second handle can move relative to the first handle;

a first spring for biasing the cable received by the first handle in tension; and an actuating mechanism for applying force to the first spring to reduce the bias thereof and to reduce the tension in the cable;

wherein movement of the second handle towards the first handle within the first portion of the pivot distance that the second handle can move relative to the first handle actuates the actuating mechanism to reduce the bias of the first spring and to reduce the tension in the cable without substantially changing the position of the second gripping element;

wherein movement of the second handle towards the first handle for the second portion of the pivot distance that the second handle can move relative to the first handle causes the second gripping element to pivot open relative to the first gripping element; and wherein the arm is substantially inflexible when the first spring biases the cable in tension and the arm is flexible when the tension in the cable is reduced.

18. The apparatus of claim 17, wherein the first portion of the pivot distance that the second handle can move relative to the first handle is variable.

19. The apparatus of claim 18, wherein the first portion of the pivot distance that the second handle can move relative to the first handle is varied using a screw.

20. The apparatus of claim 17, wherein the actuating mechanism comprises a cam operatively connected to the second handle for applying force to the first spring to reduce the bias thereof and to reduce the tension in the cable.

21. The apparatus of claim 20, wherein the actuating mechanism further comprises a lever arm between the cam and the first spring for applying force to the first spring in response to movement of the cam to reduce the bias of the first spring and to reduce the tension in the cable.

22. The apparatus of claim 17, further comprising a second spring for biasing at least one of the second handle and the second gripping element closed.

23. The apparatus of claim 22, wherein the pivot mechanism includes a pivot rod and the second spring comprises a coil spring which is coiled around the pivot rod.

24. The apparatus of claim 17, wherein the first handle and the first gripping element are formed as an integrated unit.

25. The apparatus of claim 17, wherein the first handle and the first gripping element are separate components which are operatively connected together.

26. The apparatus of claim 17, wherein a second end of the cable is held in a substantially fixed relationship to the arm.

27. The apparatus of claim 26, wherein the second end of the cable is held in a substantially fixed relationship to the arm at a second end of the arm.

28. The apparatus of claim 17, wherein a mounting element is disposed at a second end of the arm.

29. The apparatus of claim 28, wherein the mounting element is selected from the group including: (a) a temporary mounting element; and (b) a permanent mounting element.

30. The apparatus of claim 29, wherein the mounting element is selected from the group including: (a) a clamp; (b) a threaded fastener; (c) a suction cup; and (d) a weighted base.

* * * * *